(12) United States Patent
Bialek

(10) Patent No.: US 10,532,813 B2
(45) Date of Patent: Jan. 14, 2020

(54) DUAL PURPOSE VEHICLE FOR AIR AND GROUND TRANSPORTATION, AND RELATED METHODS

(71) Applicant: Jason Bialek, Arlington, WA (US)

(72) Inventor: Jason Bialek, Arlington, WA (US)

( * ) Notice: Subject to any disclaimer, the term of this patent is extended or adjusted under 35 U.S.C. 154(b) by 387 days.

(21) Appl. No.: 15/308,593

(22) PCT Filed: May 5, 2015

(86) PCT No.: PCT/US2015/029164
§ 371 (c)(1),
(2) Date: Nov. 2, 2016

(87) PCT Pub. No.: WO2015/179122
PCT Pub. Date: Nov. 26, 2015

(65) Prior Publication Data
US 2017/0183093 A1    Jun. 29, 2017

Related U.S. Application Data

(60) Provisional application No. 61/988,795, filed on May 5, 2014.

(51) Int. Cl.
*B64C 37/00* (2006.01)
*B64C 3/56* (2006.01)
(Continued)

(52) U.S. Cl.
CPC ............. *B64C 37/00* (2013.01); *B60F 5/02* (2013.01); *B64C 3/56* (2013.01); *B64C 11/00* (2013.01)

(58) Field of Classification Search
CPC ......... B64C 27/26; B64C 27/20; B64C 27/28; B64C 29/0025; B64C 29/0033;
(Continued)

(56) References Cited

U.S. PATENT DOCUMENTS 2,893,661 A * 7/1959 Aylor ................. B60F 5/02
244/103 R
2,938,681 A * 5/1960 Palermo ............. B62K 17/00
244/49

(Continued)

FOREIGN PATENT DOCUMENTS

| GB | 191405290 | * | 11/1914 |
| GB | 143591 | * | 5/1920 |
| GB | 422188 | * | 1/1935 |

*Primary Examiner* — Justin M Benedik
(74) *Attorney, Agent, or Firm* — Janeway Patent Law, PLLC; John M. Janeway

(57) ABSTRACT

A vehicle for providing one or more people air and ground transportation includes a body, a wing, and a coupler that attaches the wing to the body. The body is configured to carry one or more people. The wing is moveable from a first position (ground mode) in which the wing does not generate lift as the body moves through the air, to a second position (flight mode) in which the wing does generate lift as the body moves through the air. The coupler is configured to hold the wing in the first and second positions, and to hold the wing as the wing moves from the first position to the second position, during which the wing rotates about a longitudinal axis. Some embodiments of the vehicle successfully combine aircraft design features with three-wheeled motorcycle design features to create an aesthetically pleasing vehicle that can be driven from an origin on the ground to a safe location for a conventional takeoff, and transitioned, in minimal time, from a road vehicle to an aircraft with safe, conventional controls that provide good handling characteristics on par or better than general aviation aircraft on the market today.

19 Claims, 12 Drawing Sheets

(51) Int. Cl.
*B60F 5/02* (2006.01)
*B64C 11/00* (2006.01)

(58) Field of Classification Search
CPC . B64C 37/00; B64C 3/56; B64C 11/00; B60F 5/02
See application file for complete search history.

(56) References Cited

U.S. PATENT DOCUMENTS

| | | | | |
|---|---|---|---|---|
| 4,483,499 A | * | 11/1984 | Fronk | B64D 9/00 244/118.1 |
| 4,881,700 A | * | 11/1989 | Sarh | B60F 5/02 244/2 |
| 2012/0292953 A1 | * | 11/2012 | Kunze | A61G 3/06 297/130 |

* cited by examiner

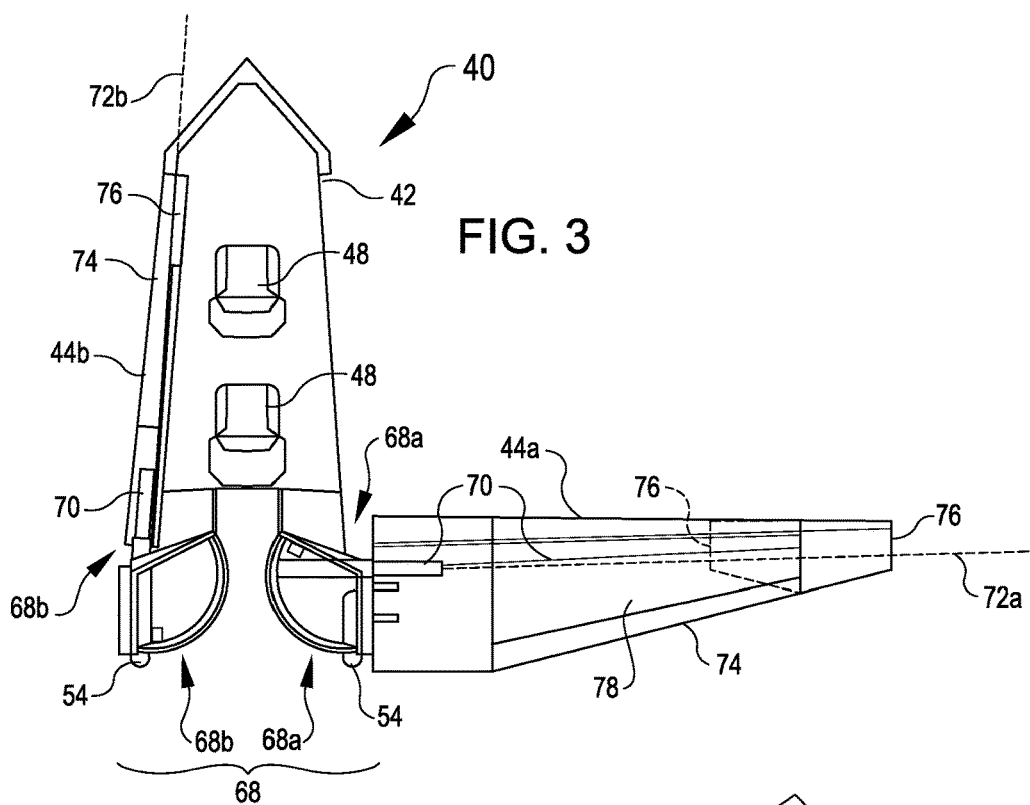
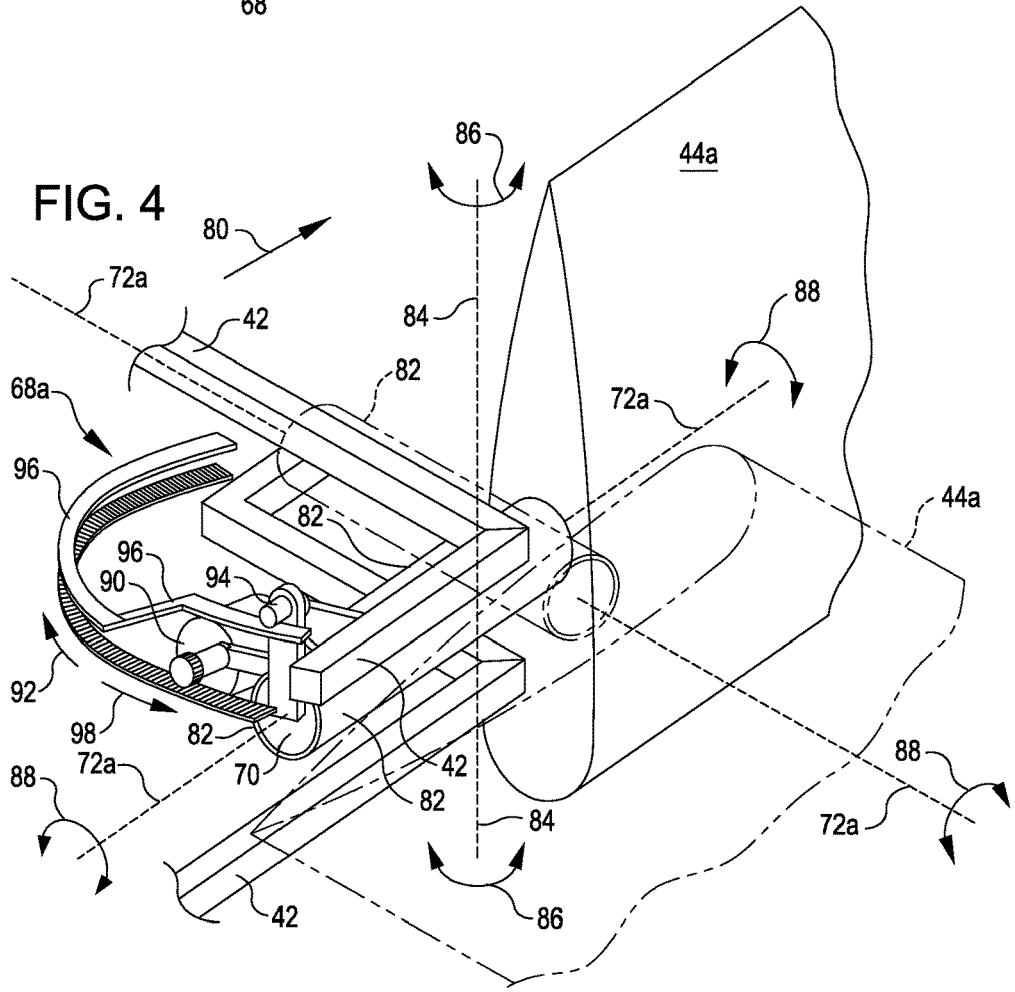

DUAL PURPOSE VEHICLE FOR AIR AND GROUND TRANSPORTATION, AND RELATED METHODS

CROSS REFERENCE TO RELATED APPLICATION AND CLAIM OF PRIORITY

This application claims priority from commonly owned U.S. Provisional Patent Application 61/988,795, filed 5 May 2014, and titled Flex 200: Fun to drive two-seat enclosed motorcycle that offers the flexibility of flight, which is currently pending and incorporated herein in its entirety by reference.

BACKGROUND

The beginning of the 20$^{th}$ century was a revolutionary time for transportation, with the invention of automobiles, motorcycles, and airplanes. Since that time, engineers have endeavored to combine the capabilities of ground vehicles and airplanes to create a vehicle that one can operate on ground and in air. For some time, multi-role vehicles have been desirable for both personal and professional use. Many daily commutes involve long circuitous drives around natural obstacles, such as lakes or rivers, or around unnatural obstacles, such as heavy traffic or large sprawling suburbs with lower speed limits. To make a trip quicker, the operator of a multi-role vehicle can leave the ground, travelling by direct route—over a lake, river, or slow traffic—to a location where the vehicle can safely land near the final destination, drive the remaining short distance, and park just as any other ground vehicle would. Similarly, a multi-role vehicle will allow professionals such as doctors, police, or border patrol agents to more quickly reach people in remote locations that normally require many extra hours or days to assist when using conventional ground transport. These types of difficult to access locations may also necessitate a combination of an aircraft and multiple vehicles, each strategically positioned ahead of time at various locations along the journey, especially where road infrastructure is near impassable and where pre-positioning extra ground vehicles at various locations along the trip route would be extremely difficult. Often, for pleasure, government work, or commercial purposes, it is desirable, at a moment's notice, to travel to a destination between 80 and 300 miles away, without regard for prior planning. A multi-role vehicle allows an operator to drive to a nearby location where a safe conventional takeoff can be made, followed by a flight at typical aircraft speeds, and a landing at a safe location near the destination. After landing, a short drive to the final destination can be completed. This approach, using the vehicle's unique capabilities, typically cuts travel time in half, making possible "day adventures", inspections, meetings, and other missions that otherwise may have taken two days or been quite exhausting when using conventional means of travel.

A multi-role vehicle is quite helpful in areas of the world where travel between islands or the mainland and islands is necessary. Such a vehicle is not a panacea for traffic woes and will not completely displace cars or airplanes. Already competent operators of motorcycles or automobiles will still need to be trained to be skilled in aircraft before they will be able to safely enjoy all the benefits of a multi-role vehicle, at least until autonomous self-navigating vehicles become more widely accepted and economically viable. Rather, a multi-role vehicle makes easy work of missions that are near impossible to complete as quickly or readily when using several separate conventional vehicles. Examples of missions where multi-role vehicles offer significant advantages include activities that take place at medium to long distances from home or office, or when access via conventional ground vehicles is time consuming. The differences between conventional and multi-role vehicles are striking when total time available for the round trip is limited, perhaps on a rare three day weekend when family time is precious, or in between international trips during a busy work week.

In general, design considerations for a vehicle capable of flight, with reasonable handling characteristics and a safe, robust design that does not involve translating or transforming primary pitch or yaw control surfaces during transitions between ground and air modes, are not compatible with design considerations for a typical motorcycle, car, or truck. The federal highway safety and EPA requirements for cars, trucks and motorcycles generally result in a weight penalty for an aircraft. An aircraft requires a wing to generate lift, but such a wing substantially reduces the aircraft's ground maneuverability and is aesthetically undesirable if the aircraft is ever "driven" on conventional roadways, even when wings are retracted via prior art methods. In addition, the overall weight of an aircraft is very important, while not as critical for a ground based vehicle. Thus, aircraft components are often designed and located to minimize weight, not necessarily located in a position that would benefit vehicle occupants in the event of a side or rear collision on the ground. Heavy parts in a ground based vehicle are often located in the vehicle to protect occupants, with more limited consideration of any impact on the vehicle's fore or aft center-of-gravity location. Contrast that with the structural design and placement of heavier aircraft component parts, such as the airframe and wings, often demanding use of a minimum amount of the lightest possible material and a carefully selected location critical to the performance of the aircraft in flight. Unfortunately, if a conventional aircraft were to be operated on the ground, such traditional design methods significantly reduce the protection afforded a pilot and/or passenger in a potential collision with other ground vehicles. No other multi-role vehicles to date have used critical structural parts that must be strong for the flight mode mission in a location that enhances protection of vehicle occupants in rear and side collisions without requiring any additional frame structure around the occupants and without the associated weight penalty of redundant structure.

SUMMARY

In one aspect of the invention, a vehicle for providing one or more people air and ground transportation includes a body, a wing, and a coupler that attaches the wing to the body. The body is configured to carry one or more people. The wing is moveable from a first position (ground mode) in which the wing does not generate lift as the body moves through the air, to a second position (flight mode) in which the wing does generate lift as the body moves through the air. The coupler is configured to hold the wing in the first and second positions, and to hold the wing as the wing moves from the first position to the second position, during which the wing rotates about a longitudinal axis.

One may drive the vehicle from any origin on the ground, and then fly or continue to drive to any other destination. If a river, or lake, or traffic impedes travel in ground mode, the driver can quickly divert to a location where a safe takeoff can be made, move the wing to the second position (flight mode), and fly over the obstacle. After the obstacle is overcome, one can continue to fly the vehicle with the wing in the second position, or one can land the vehicle, quickly return the wing to the first position (ground mode), and drive the vehicle toward one's final destination.

In another aspect of the invention, a vehicle for providing one or more people air and ground transportation includes a body, a wing, and a weight disposed in the wing. The body is configured to carry one or more people. The wing is moveable from a first position (ground mode) in which the wing does not generate lift as the body moves through the air, to a second position (flight mode) in which the wing does generate lift as the body moves through the air. And, the weight is moveable relative to the body to adjust the location of the vehicle's center of gravity.

With the weight moveable within the vehicle's wing, one may adjust the location of the vehicle's center of gravity while one drives the vehicle on the ground, and one may adjust the vehicle's moment of inertia, or rotational inertia, about a longitudinal axis that extends fore and aft through the vehicle's body while one flies the vehicle through the air. By adjusting the vehicle's center of gravity, one can improve the vehicle's handling characteristics while driving the vehicle on the ground. For example, when the wing is positioned next to the vehicle's body for ground transportation, one can move the weight inside the wing toward the wing's tip to locate the vehicle's center of gravity farther from the vehicle's rear wheels and closer to the vehicle's front wheel(s). This causes the weight of the whole vehicle to be more evenly distributed among the vehicle's wheels. And, by adjusting the vehicle's moment of inertia about the longitudinal axis, one can improve the vehicle's handling characteristics while one operates the vehicle in the air. For example, when the wing is positioned to generate lift while the vehicle moves through air, one can move the weight toward or away from the wing's tip to increase or decrease, respectively, the vehicle's moment of inertia. Increasing the vehicle's moment of inertia may be desirable to increase the vehicle's resistance to roll should the operator desire a more stable, slower roll, vehicle. Decreasing the vehicle's moment of inertia may be desirable to quicken the vehicle's response to a pilot's roll input. With the weight moveable within the vehicle's wing, one may also adjust the elastic response of the wing to minimize flutter or other unwanted structural responses while the vehicle travels in flight mode.

BRIEF DESCRIPTION OF THE DRAWINGS

FIG. 3 shows a view of a wing in the second position and another wing in the first position, each coupled to a body of the vehicle shown in FIGS. 1 and 2, according to an embodiment of the invention.

FIG. 4 shows a perspective, partial view of a coupler holding a wing, according to an embodiment of the invention.

Each of FIGS. 5-9 shows a view of a wing at a different position between the first and second positions as the wing is moved from the first position toward the second position, each according to an embodiment of the invention.

Figure 1:
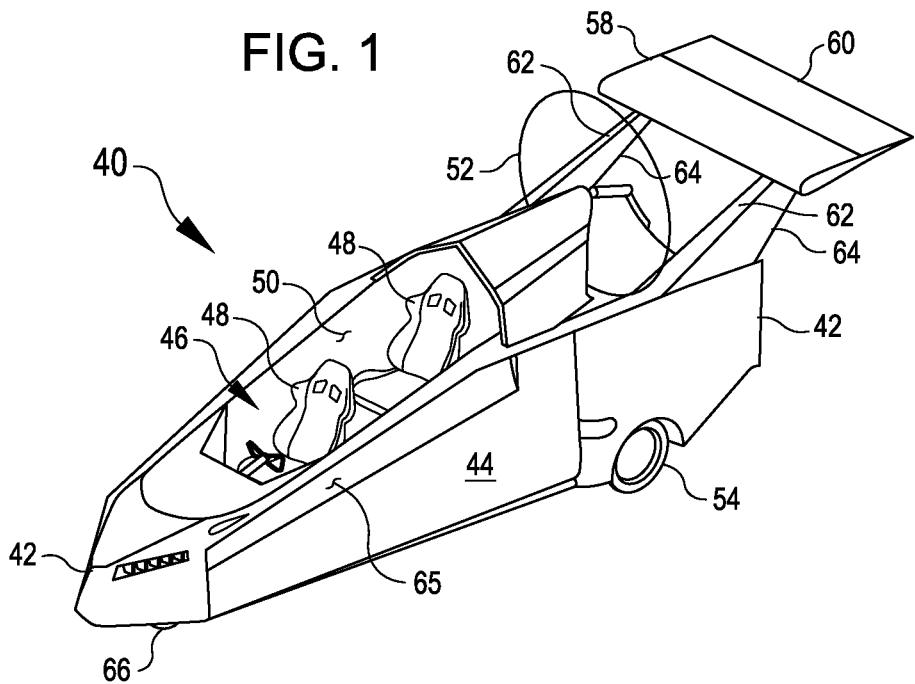
FIG. 1 shows a perspective view of a vehicle with its wing in a first position (ground mode), according to an embodiment of the invention.
Figure 2:
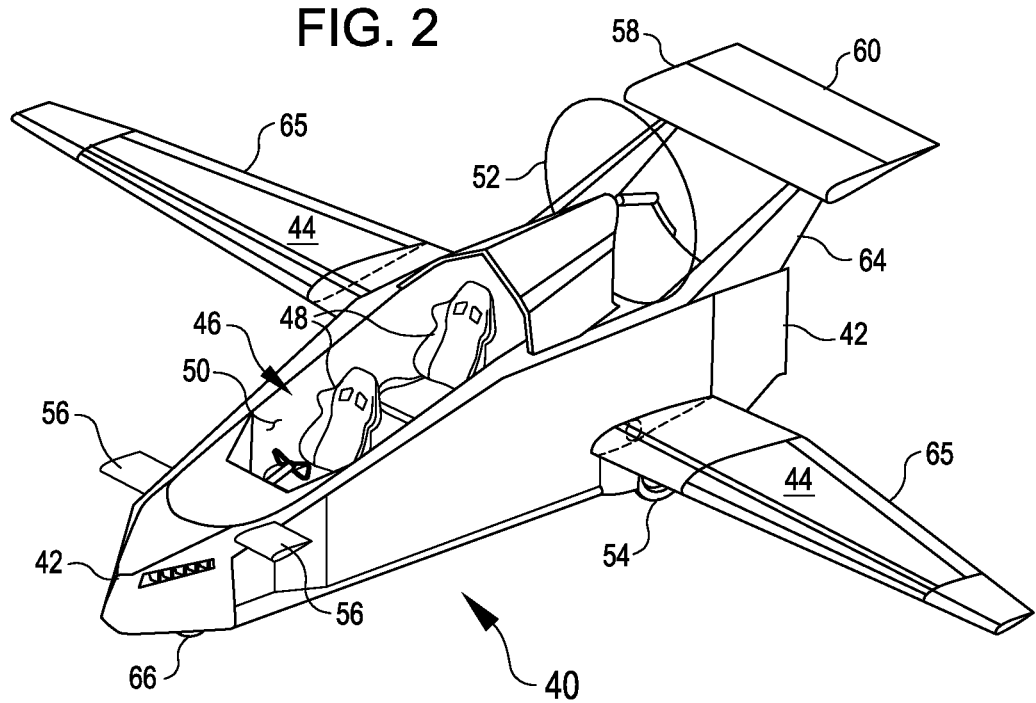
FIG. 2 shows a perspective view of the vehicle in FIG. 1 with its wings in a second position (flight mode), according to an embodiment of the invention.
Figure 5:
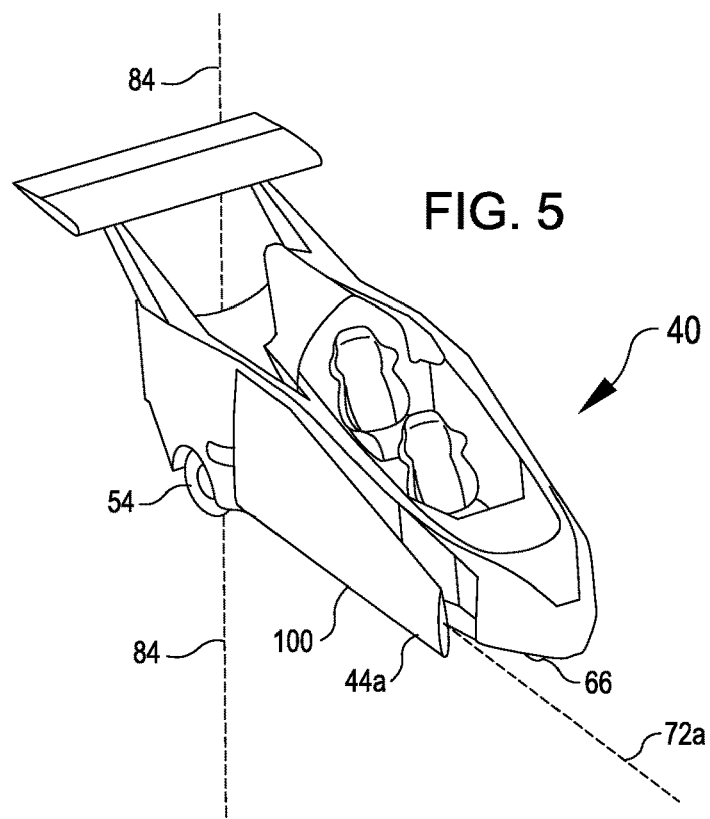
Figure 10:
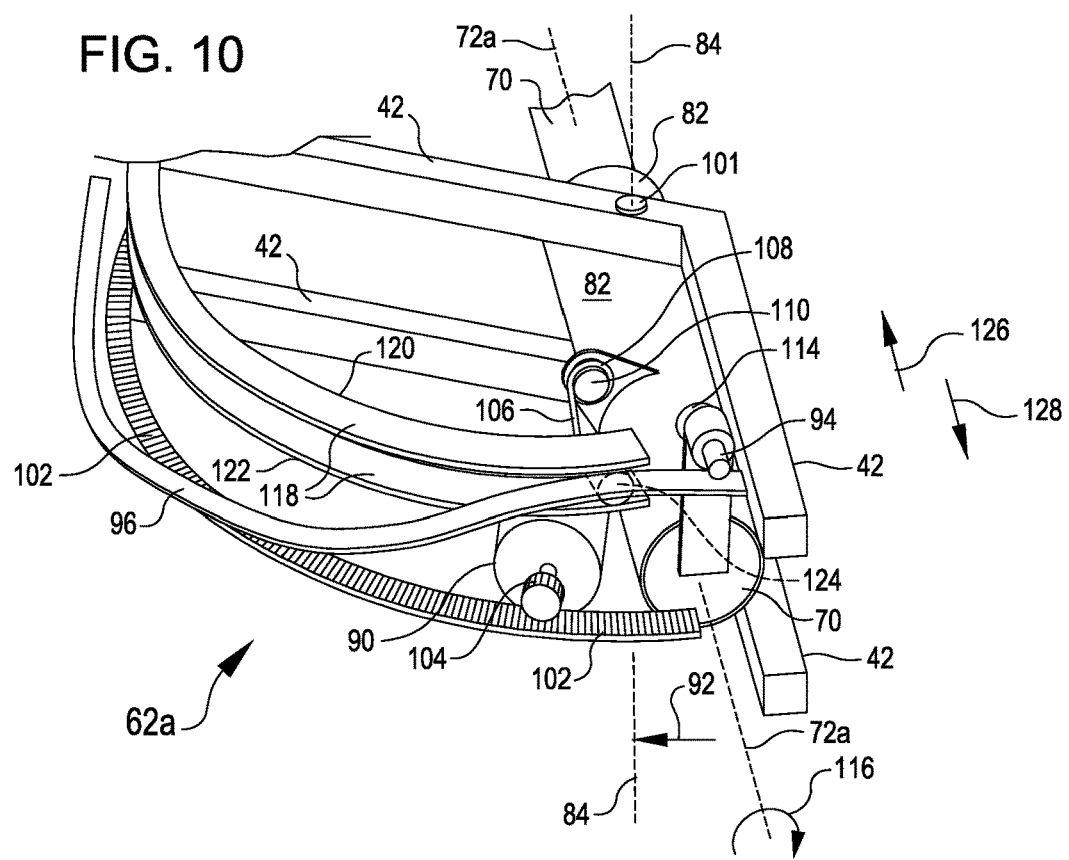

FIG. 10 shows a perspective view the coupler that attaches the wing to the body of the vehicle shown in FIGS. 1 and 2, according to an embodiment of the invention.

Figure 11:
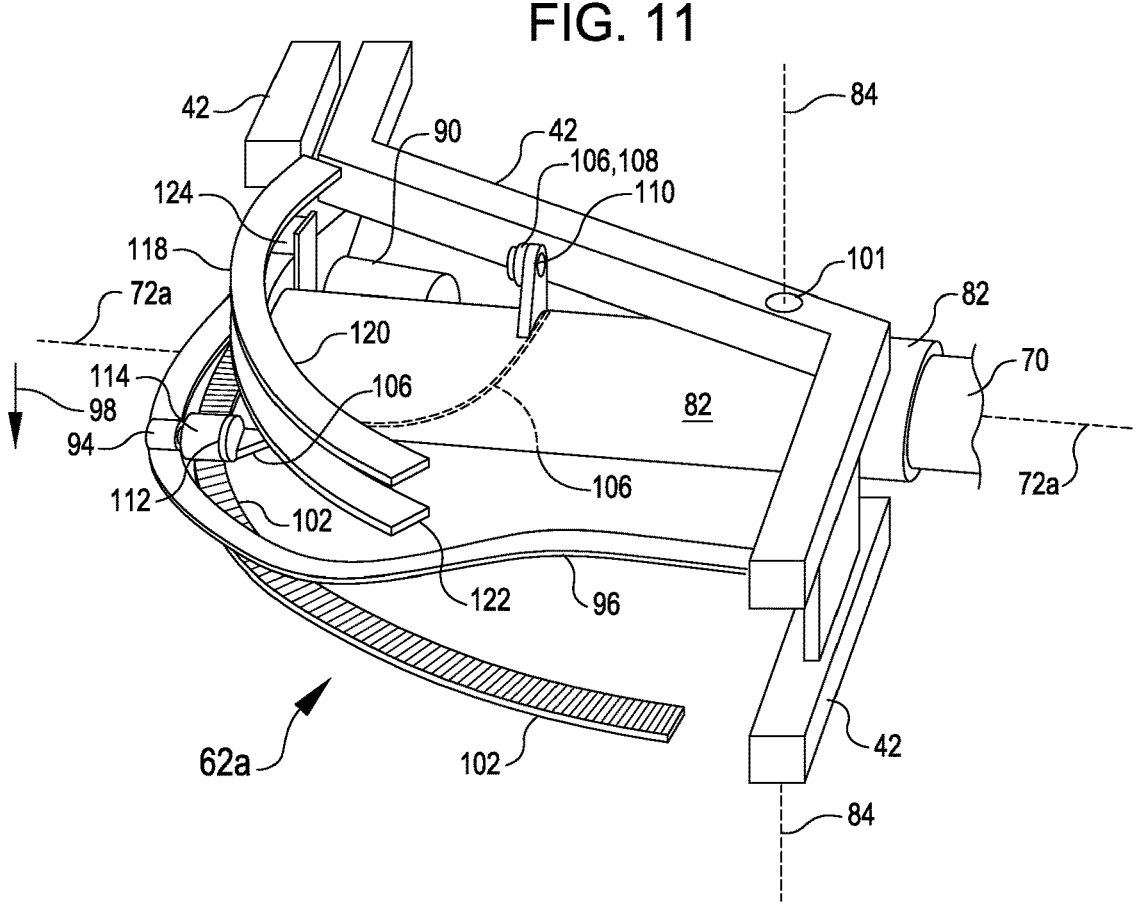

FIG. 11 shows another perspective view of the coupler shown in FIG. 10, according to an embodiment of the invention.

Figure 12:
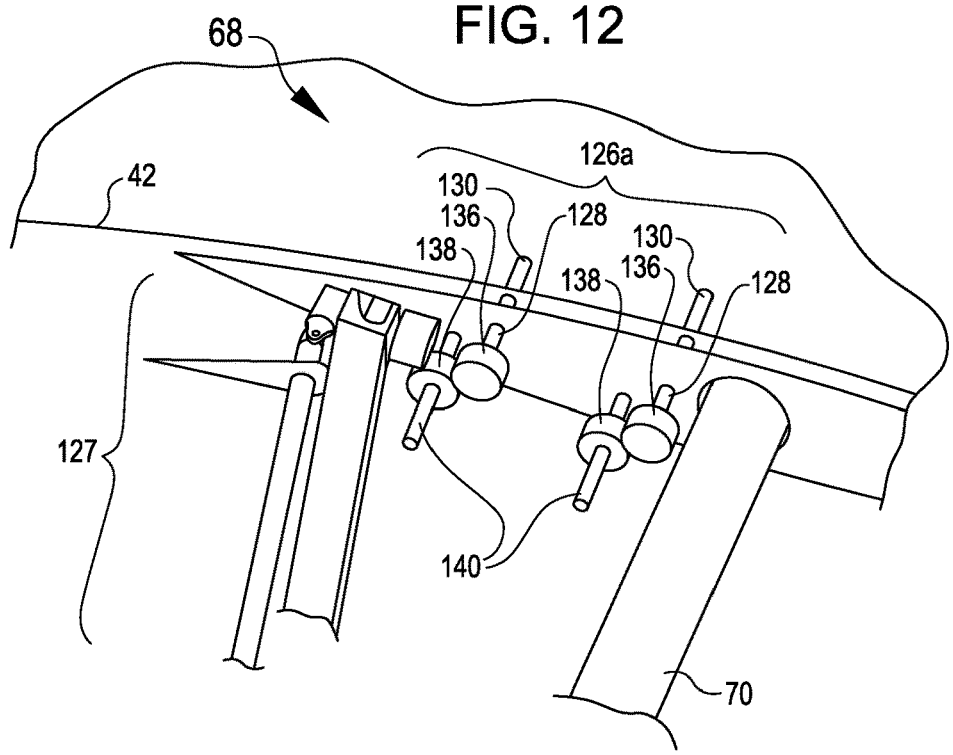

FIG. 12 shows a perspective, partial view of a wing in the second position and secured to the body of the vehicle, according to an embodiment of the invention.

Figure 13:
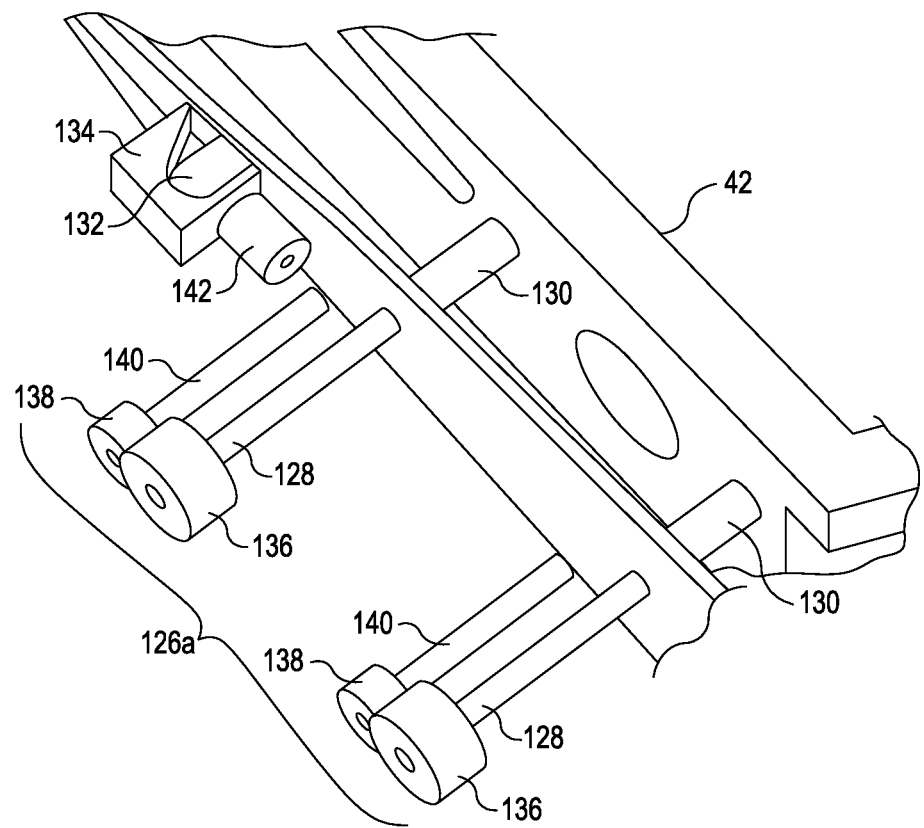

FIG. 13 shows another perspective, partial view of a wing in the second position and secured to the body of the vehicle, according to an embodiment of the invention.

Figure 14:
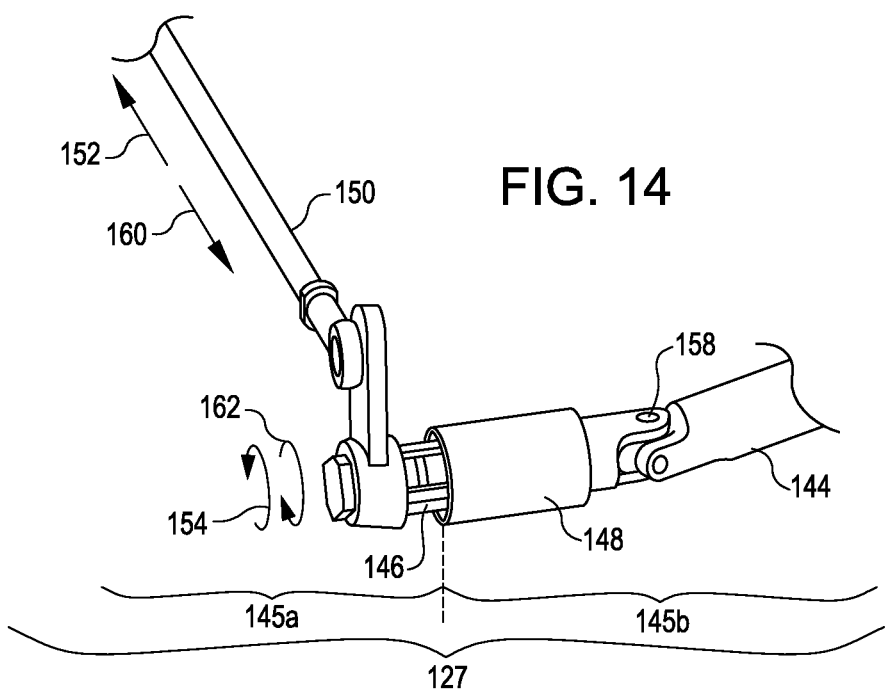

FIG. 14 shows a perspective view of the linkage that couples a wing's flaperon to the control mechanism in the cockpit of the vehicle shown in FIGS. 1 and 2, according to an embodiment of the invention.

Figure 15:
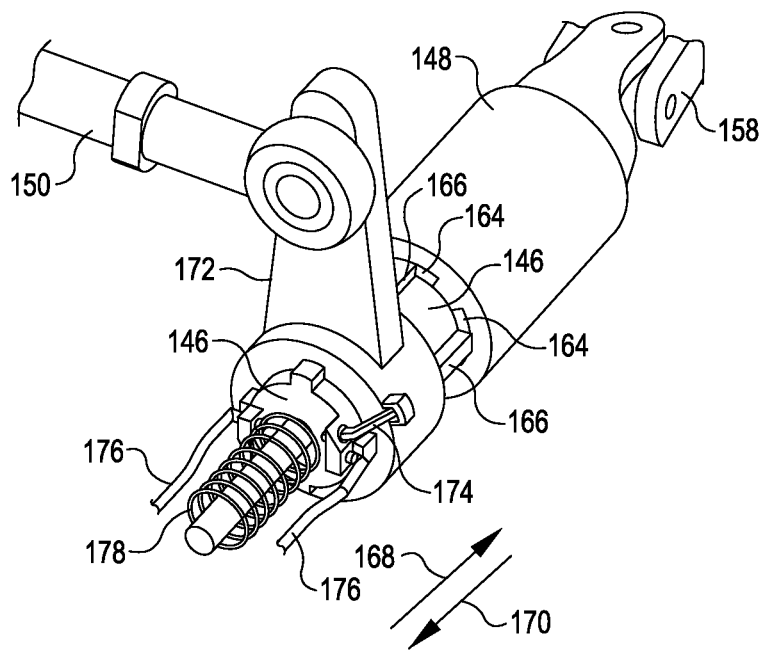

FIG. 15 shows another perspective view of the linkage shown in FIG. 14, according to an embodiment of the invention.

Figure 16:
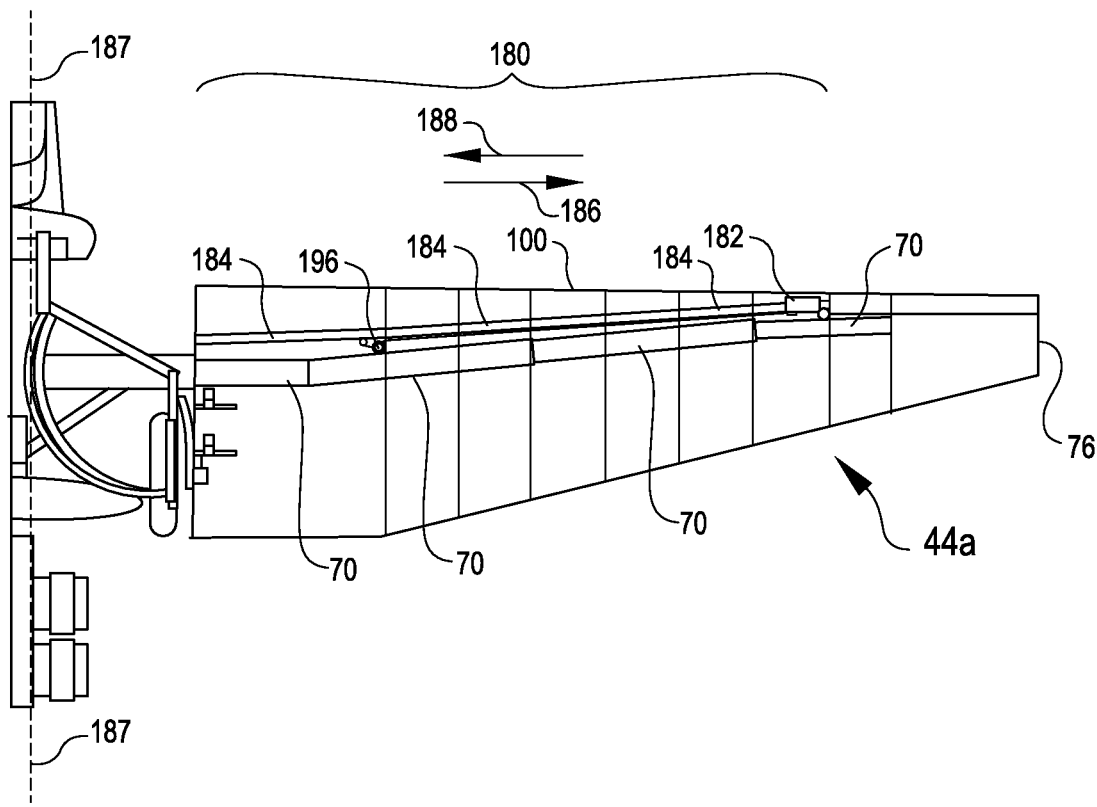

FIG. 16 shows a view of a weight system included in a wing of the vehicle shown in FIGS. 1 and 2, according to an embodiment of the invention.

Figure 17:
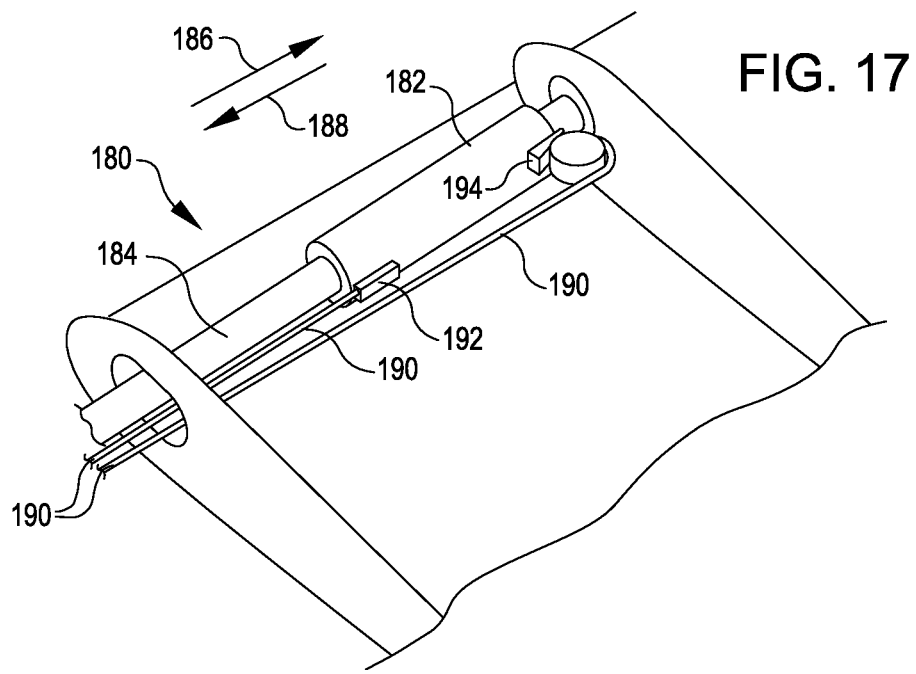

FIG. 17 shows a perspective view of a portion of the weight system shown in FIG. 16, according to an embodiment of the invention.

Each of FIGS. 18-21 shows a perspective view of canards of the vehicle shown in FIG. 2, each according to an embodiment of the invention.

Figure 22:
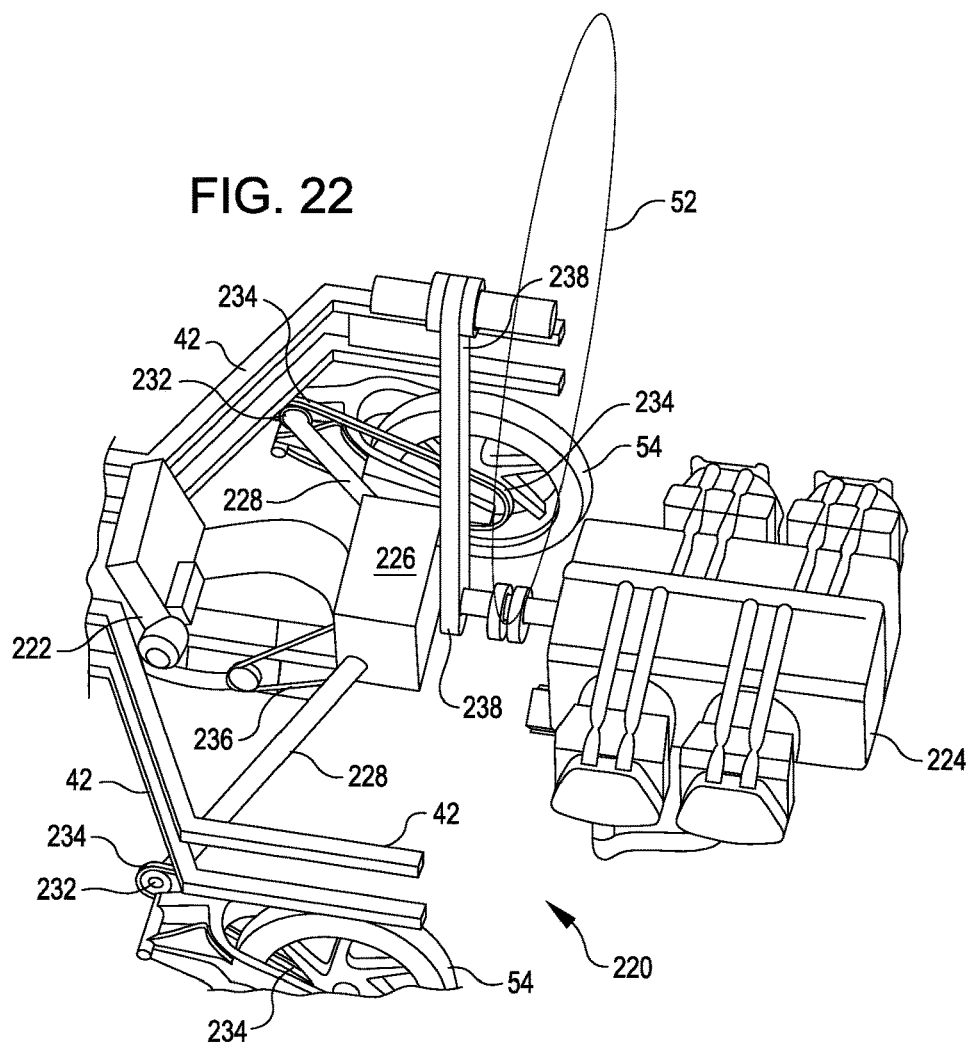

FIG. 22 shows a perspective view of the vehicle's power component, according to an embodiment of the invention.

Figure 23:
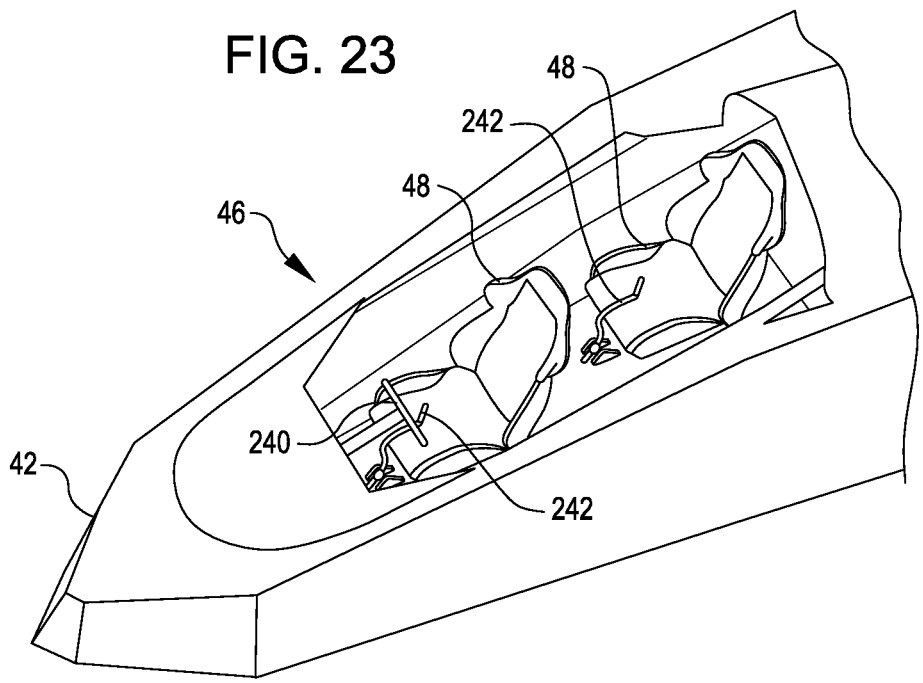

FIG. 23 shows a perspective view of a cockpit of the vehicle shown in FIGS. 1 and 2, according to an embodiment of the invention.

Figure 24:
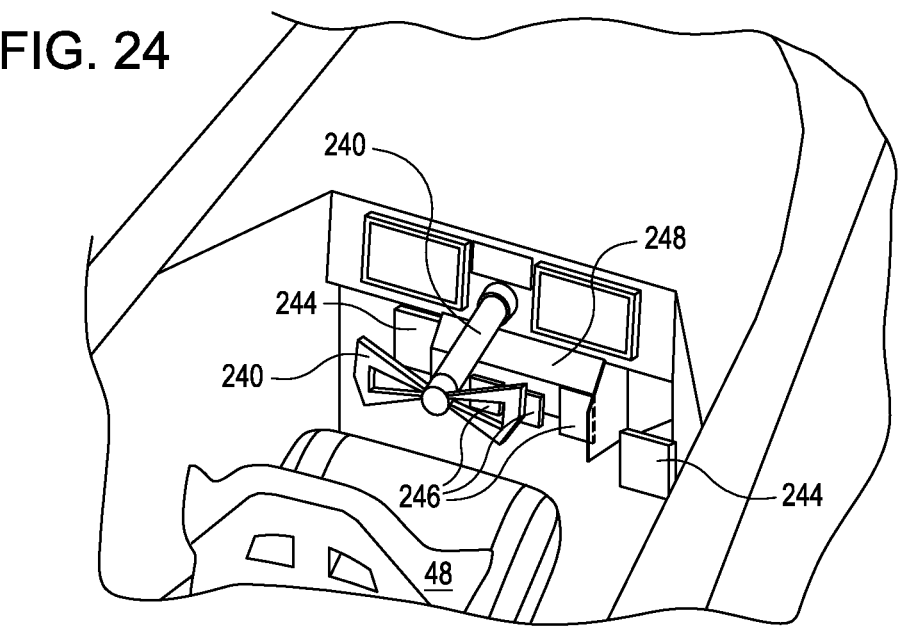

FIG. 24 shows another perspective view of the cockpit shown in FIG. 23, according to an embodiment of the invention.

DETAILED DESCRIPTION

Each of FIGS. 1 and 2 shows a perspective view of a multi-role vehicle 40, according to an embodiment of the invention. The vehicle 40 may provide ground transportation by being driven on a road, trail, or over open country much like a conventional ground vehicle, and may also provide air transportation by being flown through the air much like an airplane. Although the vehicle 40 shown here is configured to carry a person, the vehicle 40 may be configured as a remote controlled or an autonomous vehicle, such as those designed as a toy for amusement or those designed as an unmanned aerial vehicle for military use. The vehicle 40 includes a body 42, a wing 44 (here two, the second one is shown in FIG. 2 but omitted from FIG. 1 for clarity), and a coupler (not shown in FIGS. 1 and 2 but discussed in greater in conjunction with FIGS. 3-11) that attaches the wings 44 to the body 42. Each of the wings 44 is moveable from a first position (shown in FIG. 1) in which the wing 44 does not generate lift as the body 42 moves through the air, to a second position (shown in FIG. 2) in which the wing 44 does generate lift as the body 42 moves through the air. The coupler is configured to hold each of the wings 44 in the first and second positions, and to also hold each of the wings 44 as each moves from their respective first position to their respective second position. With the coupler holding the wings 42 as they move from the first position to the second position, one can transition the wings 42 from the first position to the second position, and vice versa, without stopping the vehicle 40. The vehicle 40 also includes a weight (not shown in FIGS. 1 and 2 but discussed in greater in conjunction with FIGS. 16 and 17) disposed in each of the wings 44, and moveable relative to the body 42 to adjust the location of the vehicle's center of gravity and/or moment of inertia about the vehicle's longitudinal axis or roll axis.

With the vehicle 40 one may drive from one's residential or business driveway and then fly or continue to drive to any destination. If a river, or a lake, or a traffic jam impedes the vehicle's travel in ground mode (wings 44 disposed in their respective first positions), the driver can quickly move each of the wings 44 to their respective second position to convert the vehicle 40 into flight mode to fly over the obstacle. After the obstacle is overcome, one can then continue to fly the vehicle 40 in flight mode, or one can land the vehicle 40 and quickly return each of the wings 44 to their respective first position to drive the vehicle 40 in ground mode toward one's final destination.

And, with the weight moveable within each of the vehicle's wings 44, one may adjust the location of the vehicle's center of gravity while one drives the vehicle on the ground, and one may adjust the vehicle's moment of inertia, or rotational inertia, about the vehicle's roll axis while one flies the vehicle 40 through the air. By adjusting the vehicle's center of gravity, one can improve the vehicle's handling characteristics while driving the vehicle 40 on the ground. For example, when the wings 44 are positioned next to the vehicle's body 42 for ground transportation, one can move each of the weights toward the wing tip of their respective wing 44 to locate the vehicle's center of gravity farther from the vehicle's rear wheels and closer to the vehicle's front wheel. This causes the weight of the whole vehicle to be more evenly distributed among the vehicle's wheels, while allowing a quick reversion to original center-of-gravity in the event roll-over stability is more desired at any point in time. And, by adjusting the vehicle's moment of inertia about the vehicle's roll axis, one can improve the vehicle's handling characteristics while one flies the vehicle 40 through the air. For example, when each of the wings 44 is in the second position, one can move each of the weights toward or away from the wing tip of their respective wing 44 to increase or decrease, respectively, the vehicle's moment of inertia. Increasing the vehicle's moment of inertia may be desirable to increase the vehicle's resistance to roll should the vehicle encounter an unexpected gust of wind transverse to the vehicle's direction of travel. And decreasing the vehicle's moment of inertia may be desirable to quicken the vehicle's response to a pilot's instruction to roll or bank the vehicle during turns. With the weight moveable within each of the vehicle's wings 44, one may also adjust the elastic response of each of the wings 44 to minimize flutter or other unwanted vibrations while the vehicle travels in flight mode.

Still referring to FIGS. 1 and 2, the body 42 includes a cockpit 46 for carrying a person while the vehicle 40 travels in ground or flight mode. For example, in this and other embodiments, the cockpit 46 has two seats 48, one located aft of the other, and is configured so that the instruments and controls (discussed in greater detail in conjunction with FIGS. 23 and 24) for operating the vehicle in both the flight mode and the ground mode are accessible to the person sitting in the front seat. The cockpit 46 also includes a center stick (not shown in FIGS. 1 and 2 but shown in FIG. 23) accessible to a person sitting in the rear seat to allow the person to exert some control over the vehicle 40 should the person in the front seat become incapacitated or distracted or the rear seat occupant simply wants to share in the fun. The cockpit 46 also includes a canopy 50 to protect the one or more persons in the cockpit 46 while the vehicle travels in the ground mode or in the flight mode. The canopy 50 is transparent to allow the one or more persons to see outside the vehicle 40 and includes a hinge (not shown) and sliding track (not shown) connecting the canopy 50 to the body 42 in front of and alongside the forward seat 48, allowing one to pivot and slide the canopy 50 forward to open the cockpit 46. There is one small canopy that pivots and slides out of the way that aligns with the main canopy profile when closed, forming a contiguous canopy shape when closed (as shown), or opening to allow ready access to the cockpit without obstruction to one's entry into the cockpit, either in forward or aft seats, when both canopies are open. This canopy configuration also allows easy exchange of objects between vehicle occupants and people outside the vehicle, or an "open cockpit" experience should one desire that on a nice day's drive or while flying over especially nice scenery.

In other embodiments, the cockpit 46 may include the two seats 48 located abreast. In still other embodiments, the cockpit 46 may include a single seat, or may include more than two seats, configured as desired. In other embodiments, the canopy 50 may be attached to either side of the cockpit 46 to allow one to pivot the canopy 50 left or right to open the cockpit 46.

Still referring to FIGS. 1 and 2, the vehicle 40 may also include components for powering the vehicle 40 in ground mode and in flight mode. For example, in this and other embodiments, the vehicle 40 includes a first motor for powering the vehicle 40 in ground mode, and a second motor for powering the vehicle in flight mode (both not shown in FIGS. 1 and 2, but discussed in greater detail in conjunction with FIG. 22). The vehicle 40 also includes a propeller 52 for generating thrust to power the vehicle 40 in flight mode, and a rear wheel 54 (here two, one omitted from FIGS. 1 and 2 for clarity) coupled to a driveshaft for generating thrust to power the vehicle in ground mode. Each of the first and second motors are coupled to a single differential (also discussed in greater detail in conjunction with FIG. 22) that in turn distributes power from one or both of the motors to one or both the propeller 52 and the rear wheel 54. In this manner, each motor can help the other motor power the vehicle 40 in either the ground mode or the flight mode, and each motor can be used as a backup power source should the other motor fail. In some embodiments the propeller may be foldable in the aft direction to protect the propeller 52 from road debris when not in use and while the vehicle is operated on the ground.

Still referring to FIGS. 1 and 2, the vehicle 40 may also include components for controlling the vehicle 40 while operating the vehicle 40 in flight mode. For example, in this and other embodiments, the vehicle 40 includes a canard 56 (here two; discussed in greater detail in conjunction with FIGS. 18-21) to help generate lift and enhance control of the pitch of the vehicle 40 at slower speeds and forward center-of-gravity conditions, or when at slow speed when the vehicle has a jet engine installed instead of a conventional piston or turboprop engine. The canards 56 are retractable to protect them against damage and to improve aesthetics when one operates the vehicle 40 in the ground mode. FIG. 1 shows the canards 56 retracted to a position inside the body 42, and FIG. 2 shows the canards 56 extended for operating the vehicle in flight mode. The vehicle 40 also includes a horizontal stabilizer 58 and elevator 60 pivotable relative to the stabilizer 58, to help one control the pitch of the vehicle 40 while one operates the vehicle 40 in flight mode and as a ground handling-improving spoiler while in ground mode. In addition, the vehicle 40 includes a vertical stabilizer 62 (here two) and a rudder 64 (here two) each pivotable relative to a respective one of the vertical stabilizers 62, to help one control the yaw of the vehicle 40 while one operates the vehicle 40 in flight mode and to enhance steering while operating in slippery conditions in ground mode. Also, the vehicle 40 includes a flaperon 65 (here two) each pivotable relative to a respective one of the wings 44, to help one control the roll of the vehicle 40 and to increase the coefficient of lift of the wing 44 while one operates the vehicle 40 in flight mode.

Still referring to FIGS. 1 and 2, the vehicle 40 may also include components for controlling the vehicle 40 while driving the vehicle in ground mode. For example, in this and other embodiments, the vehicle includes a front tire 66 that is rotatable relative to the body 42 to allow one to turn the vehicle 40 while one operates the vehicle 40 in ground mode.

FIG. 3 shows a view of a wing 44a in the second position and another wing 44b in the first position, each held by the coupler 68 of the vehicle 40 shown in FIGS. 1 and 2, according to an embodiment of the invention.

Each of the wings 44a and 44b may be configured as desired to generate any desired amount of lift at any desired vehicle speed. For example, in this and other embodiments the wings 44a and 44b are conventional wings configured to generate, together, between 1800 and 2900 lbs of lift when the vehicle 40 travels between 65 and 230 miles per hour in 1g flight. In this and other embodiments, each of the wings 44a and 44b also includes a spar 70 that is held by the coupler 68 and allowed to rotate relative to the coupler 68 to allow each of the wings 44a and 44b to rotate about their respective longitudinal axes 72a and 72b (discussed in greater detail in conjunction with FIGS. 4, 10 and 11). Each of the wings 44a and 44b also includes a flaperon 74 that one may use during take-offs and/or landings to increase each wing's lift at the specific take-off and/or landing speed, and thus reduce the speed that the vehicle 40 travels as the vehicle 40 transitions from flying through air to driving on the ground. The flaperon 74 may also be used by one to roll the vehicle 40 while in flight. Each of the wings 44a and 44b also includes an optional tip 76 that pivots relative to the wing's main body 78 to facilitate storing the wings 44a and 44b in the first position (see wing 44b) while allowing a greater wingspan without requiring a longer vehicle length.

Although the vehicle 40 is shown having two wings 44a and 44b, the vehicle 40 may include a single wing 44, or three or more wings 44. Furthermore, although the two wings 44a and 44b are shown located adjacent each other in the horizontal direction, essentially making the vehicle 40 a monoplane when the vehicle 40 is in flight mode, the two wings 44a and 44b may be located adjacent each other in the vertical direction, essentially making the vehicle 40 a biplane.

Still referring to FIG. 3, in this and other embodiments, the coupler 68 includes two components 68a and 68b that are very similar to each other except that each is a mirror image of the other. The coupler component 68a holds the spar 70 of the wing 44a, and the coupler component 68b holds the spar 70 of the wing 44b. In this configuration, the coupler 68 allows independent movement of each wing 44a and 44b, relative to the other wing 44b and 44a, from their respective first to second positions, and vice versa.

FIG. 4 shows a perspective, partial view of a coupler component 68a holding a wing 44a in FIG. 3, according to an embodiment of the invention. The orientation of the coupler component 68a relative to the vehicle 40 shown in FIG. 3 is indicated by the arrow 80 that points toward the front of the vehicle. Thus, the wing 44a that is shown in solid lines is in the first position (ground mode), and the wing 44a that is shown in dashed lines is in the second position (flight mode). As previously mentioned, the coupler component 68b is a mirror image of the coupler component 68a, and thus FIG. 4 and its related discussion also applies to the coupler component 68b holding the wing 44b.

In this and other embodiments, the coupler component 68a (discussed in greater detail in conjunction with FIGS. 10 and 11) includes a sleeve 82 mounted to the body 42 such that the sleeve 82 may pivot about a pivot axis 84 in the directions indicated by the arrows 86. The sleeve 82 holds the spar 70 of the wing 44a and allows the wing 44a to rotate about the longitudinal axis 72a in the directions indicated by the arrows 88, independent of the sleeve's rotation about the pivot axis 84. In this configuration, the sleeve 82 holds the spar 70 when the wing 44a is in the first position, the second position, and while the wing 44a is moved from the first position toward the second position, and vice versa. To move the wing 44a from the first position to the second position, the motor 90 pulls the sleeve 82, and thus the spar 70, in the direction of the arrow 92. As the spar 70 moves, a pivot-follower 94 mounted to the spar 70 rolls across a pivot-track 96 that directs the spar 70 to rotate relative to the sleeve 82 about the longitudinal axis 72a. Thus, as the sleeve 82 moves through specific angle locations during its rotation about the pivot axis 84, the spar 70 rotates about the longitudinal axis 72a. To move the wing 44a from the second position to the first position, the motor 90 pushes the sleeve 82, and thus the spar 70, in the direction of the arrow 98.

Each of FIGS. 5-9 shows a view of the wing 44a at a different position between the first and second positions as the wing 44a is moved from the first position toward the second position, each according to an embodiment of the invention. When the wing 44a is in the first position, the leading edge 100 of the wing 44a is adjacent the wheels 54 and 66 of the vehicle 40, and the wing 44a does not generate lift as the vehicle 40 travels on the ground. When the wing 44a is in the second position, the leading edge 100 points toward the front of the vehicle 40, and the wing does generate lift as the vehicle 40 travels on the ground or through the air. As the wing 44a moves from the first position toward the second position, the wing 44a rotates about the pivot axis 84 (FIG. 4) to orient itself transverse to the direction of travel, and rotates about the longitudinal axis 72a to orient itself to generate lift as the vehicle 40 travels. The rotation of the wing 44a about the longitudinal axis 72a is synchronized to the rotation of the wing 44a about the pivot axis 84. More specifically, the angular position of the wing 44a about the pivot axis 84 dictates the angular position of the wing 44a about the longitudinal axis 72a. To keep the wing 44a from generating lift before it gets close to the second position, the wing 44a follows a schedule that does not allow the wing 44a to complete its rotation about the longitudinal axis 72a until the wing 44a is close to completing its rotation about the pivot axis 84. This causes the wing's angle of attack to remain negative until just before the wing 44a is in the second position. This allows retraction and extension of the wing 44a while the vehicle is traveling at up to 35 miles per hour on the ground without losing stability or control.

Figure 6:
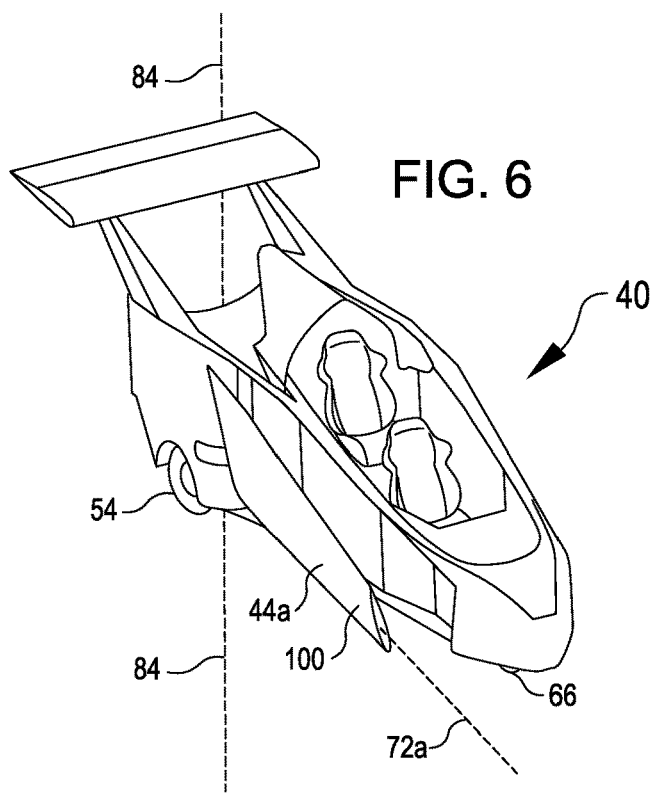
Figure 7:
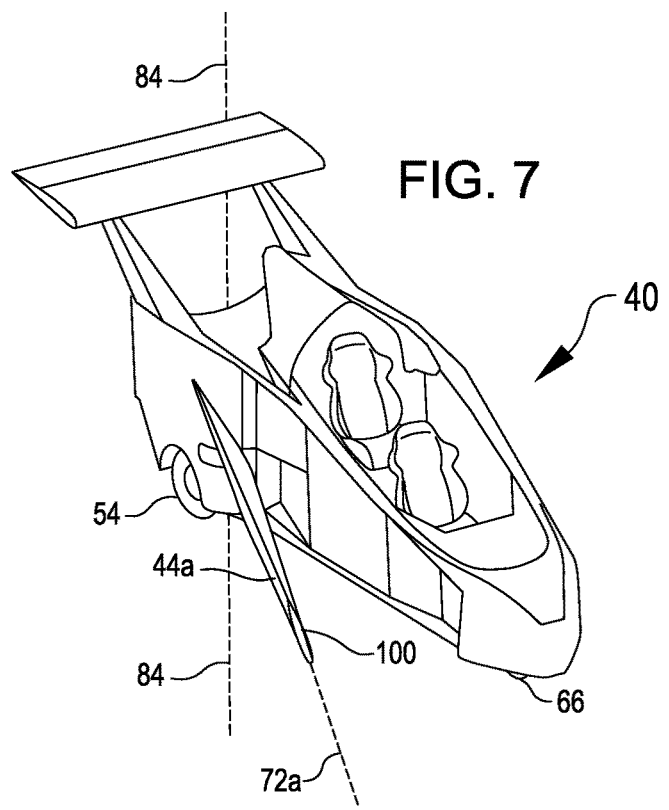
Figure 8:
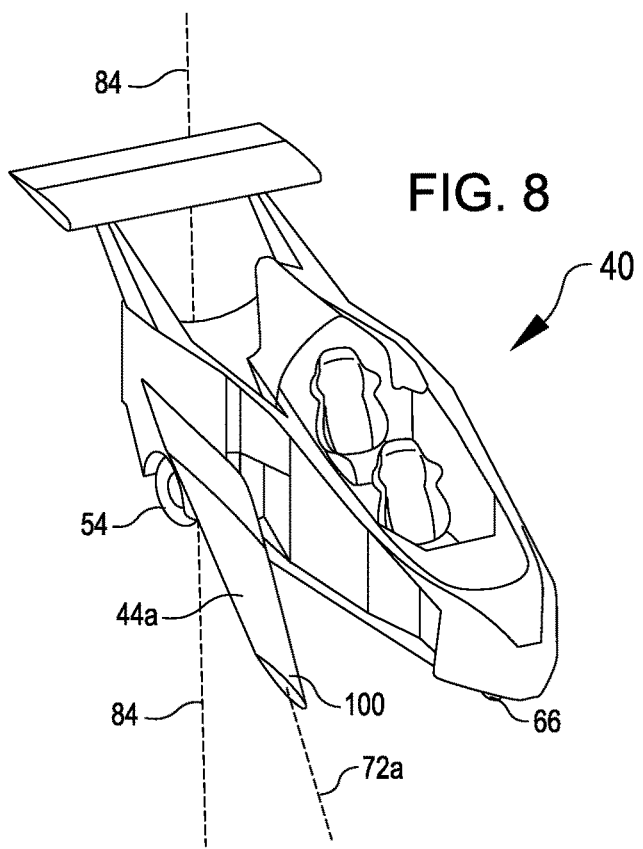
Figure 9:
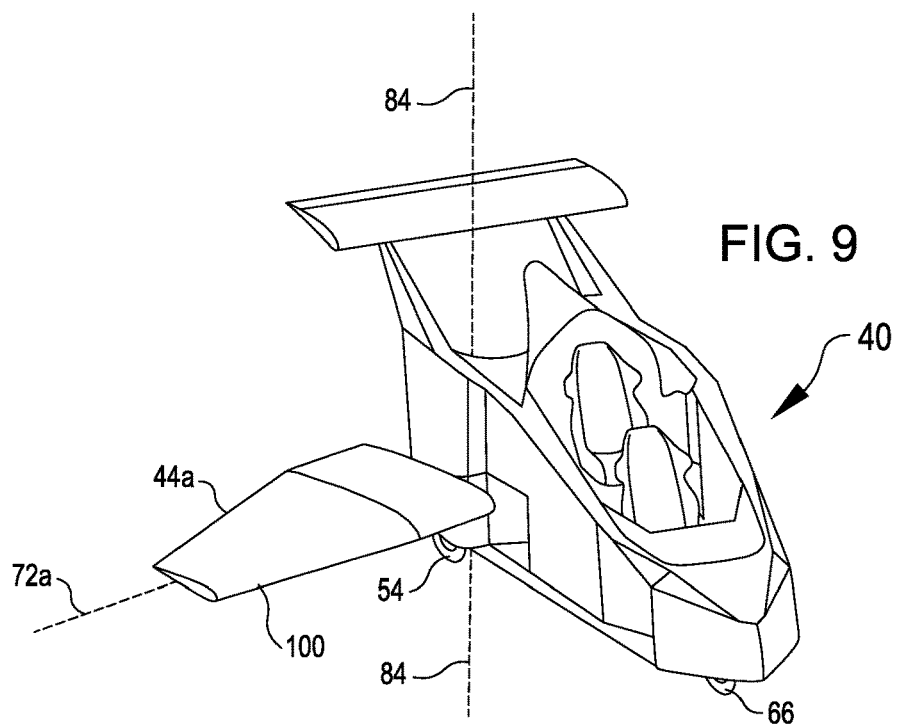

The schedule that the wing 44a follows as it moves from the first position to the second position may be any desired schedule that prevents the wing 44a from completing its rotation about the longitudinal axis 72a until the wing 44a is close to completing its rotation about the pivot axis 84. For example, in this and other embodiments, the schedule may include the following relationships between the angular positions of the spar 70 about the pivot axis 84 and the longitudinal axis 72a. As the spar 70 rotates about the pivot axis 84 from 0° (first position) to 9.5°, the spar 70 does not rotate about the longitudinal axis 72a, i.e. the spar 70 remains at 0° about the longitudinal axis 72a (see in FIG. 5). After passing through 9.5° about the pivot axis 84, the spar 70 begins rotating about the longitudinal axis 72a at the rate of 3° for every 1° about the pivot axis 84. Then, as the spar 70 passes through 14.5°, the rotation of the spar 70 about the longitudinal axis 72a slows to 1.2° for every 1° about the pivot axis 84 (see FIGS. 6-9). FIG. 6 shows the wing 44a with its spar 70 at 20° about the pivot axis 84 and 27° about the longitudinal axis 72a. FIG. 7 shows the wing 44a with its spar 70 at 30° about the pivot axis 84 and 39° about the longitudinal axis 72a. FIG. 8 shows the wing 44a with its spar 70 at 40° about the pivot axis 84 and 51° about the longitudinal axis 72a. And FIG. 9 shows the wing 44a with its spar 70 at 74.5° about the pivot axis 84 and 88° about the longitudinal axis 72a. Then, as the spar 70 passes through 74.5° about the pivot axis 84, the rotation of the spar 70 about the longitudinal axis 72a slows to 0.4° for every 1° about the pivot axis 84. After passing through 79.5° about the pivot axis 84, the spar 70 reaches 90° about the longitudinal axis 72a and stops rotating about the longitudinal axis 72a, as the spar 70 continues rotating about the pivot axis 84. When the spar 70 reaches 90° about the pivot axis 84, the wing 44a reaches the second position.

The schedule that the wing 44a follows as it moves from the second position to the first position may also be any desired schedule. For example, in this and other embodiments, the wing 44a follows the schedule described above but in reverse.

Other embodiments are possible. For example, the schedule that the wing 44a follows when moving from the first position to the second position may be different than the schedule that the wing 44a follows when moving from the second position to the first. As another example, the location at which the spar 70 of the wing 44a starts and finishes it rotation about the longitudinal axis 72a may be before or after the spar reaches 9.5° about the pivot axis 84. As yet another example, the rate at which the spar 70 rotates about the longitudinal axis 72a relative to the pivot axis 84 may be quicker than 3° for every 1° about the pivot axis 84, or slower than 0.4° for every 1° about the pivot axis 84.

Each of FIGS. 10 and 11 shows a perspective view the coupler component 68a that attaches the wing 44a to the body 42 of the vehicle 40 shown in FIGS. 1 and 2, according to an embodiment of the invention. FIG. 10 shows the coupler component 68a holding the wing 44a in the first position, and FIG. 11 shows the coupler component 68a holding the wing 44a in a position close to the second position. As previously mentioned, the coupler component 68b (FIG. 4) is a mirror image of the coupler component 68a, and thus FIGS. 10 and 11 and their related discussion also applies to the coupler component 68b holding the wing 44b.

In operation, the motor 90 pulls the sleeve 82, and thus the spar 70, in the direction of the arrow 92 (FIG. 10) to move the wing 44a from the first position to the second position. As the spar 70 moves, a pivot-follower 94 mounted to the spar 70 rolls across and remains in contact with a pivot-track 96 that locates the angular position of the spar 70 about the longitudinal axis 72a relative to the sleeve 82 as the sleeve 82 and spar 70 rotate about the pivot axis 84. Thus, as the sleeve 82 moves through specific angle locations during its rotation about the pivot axis 84, the spar 70 rotates about the longitudinal axis 72a. To move the wing 44a from the second position to the first position, the motor 90 pushes the sleeve 82, and thus the spar 70, in the direction of the arrow 98 (FIG. 11).

The spar 70 may be mounted to the sleeve 82, and the sleeve 82 may be mounted to the body 42 of the vehicle 40, as desired to allow the sleeve 82 to resist damaging deformation while the sleeve 82 experiences bending and shear loads from the spar 70 while the wing 44a generates lift, and while the wing 44a is held in the second position. For example, in this and other embodiments the coupler component 62a includes a bearing (not shown) disposed inside the sleeve 82 between the sleeve's interior surface and the spar's exterior surface that allows the spar 70 to rotate relative to the sleeve 82 about the longitudinal axis 72a. The coupler component 62a also includes a first pin 101 fixed to the sleeve 82 and received by a bearing (not shown) disposed in the body 42, and a second pin (not shown) fixed to the sleeve 82 at a location diametrically opposite the first pin 101. The second pin is also received by a bearing (also not shown) disposed in the body 42. Both bearings hold their respective one of the pins and prevent movement of the sleeve 82 relative to the vehicle's body 42 in all directions except rotation about the pivot axis 84. With the sleeve 82 mounted to the body 42 in this manner, the sleeve 82 is essentially a gimbal. In other embodiments, the spar 70 may be mounted to the sleeve 82 and the sleeve 82 may be mounted to the vehicle's body 42, via a ratchet and pawl mechanism.

In this and other embodiments, the coupler component 68a includes a motor 90 mounted to the sleeve 82, and a rack 102 that has teeth and that is mounted to the body 42 of the vehicle 40. The motor 90 includes a gear 104 that also has teeth. The gear's teeth and the rack's teeth are configured to mesh with each other so that when the motor 90 rotates the gear 104, the rotation of the gear 104 causes the gear 104 and thus the motor 90 to walk along or move relative to the rack 102. This, in turn, causes the sleeve 82 to move in the same direction relative to the rack 102.

The motor 90, rack 102, and gear 104 may be configured as desired to provide and handle the torque required to rotate the wing 44a about the pivot axis 84. For example, in this and other embodiments, the motor 90 is a conventional electric motor that may be powered by direct or alternating current, and the rack 102 and gear 104 include stainless steel material and conventionally designed and cut teeth. In other embodiments, the coupler component 62a may include a transmission that draws power from the vehicle's main motor (discussed in greater detail in conjunction with FIG. 22) that powers the vehicle 40.

Still referring to FIGS. 10 and 11, the coupler component 68a also includes a bias element 106 to urge the pivot-follower 94 of the spar 70 against the pivot-track 96 while the spar 70 rotates about the pivot axis 84. In this and other embodiments, the bias element 106 includes a first end 108 fastened to a mount 110 of the sleeve 82, a second end 112 fastened to a mount 114 of the spar 70, and an elastic body that when stretched generates tension between the first and second ends 108 and 112, respectively. When the first and second ends 108 and 112 are mounted to their respective mounts 110 and 114, the bias member 106 wraps around the sleeve 82 and is stretched to generate tension. Because, the bias member 106 wraps around the sleeve 82, the tension generated by the bias member's body urges the spar 70 to rotate in the direction shown by the arrow 116 (FIG. 10) as the spar 70 rotates about the pivot axis 84 toward the second position. Thus, the bias member 106 helps insure that the wing 44a will rotate in the correct direction about the longitudinal axis 72a to properly orient the wing 44a for lift in the second position. And, the bias member 106 keeps the pivot-follower 94 in contact with the pivot-track 96 while the sleeve 82 and spar 70 rotate about the pivot axis 84 to help insure that the wing 44a rotates about the longitudinal axis 72a according to the established schedule, such as the one discussed in conjunction with FIGS. 5-9.

The bias element 106 may be configured as desired to provide enough force to the spar 70 to keep the pivot-follower 94 against the pivot-track 96. For example, in this and other embodiments, the bias element 106 includes a plastic material that when stretched between the mounts 110 and 114 elastically deforms, similar to any typical bungee or shock cord. The plastic material may be any conventional rubber or other polymer, and sized to generate substantial tension so that one may move the wing 44a from the first position to the second position while the vehicle 40 is moving. As the vehicle 40 moves, the air that the wing 44a contacts generates drag and pressure on the wing 44a that it would not otherwise experience. So, in such situations the tension that the bias element 106 generates needs to overcome any resistance from these additional sources. In other embodiments, the bias element 106 may include a hydraulic circuit to urge the pivot-roller 94 against the pivot-track 96 while the sleeve 82 and spar 70 rotate about the pivot axis 84. In still other embodiments, the bias element 106 may include an electrical circuit that charges a solenoid to urge the pivot-roller 94 against the pivot-track 96 while the sleeve 82 and spar 70 rotate about the pivot axis 84.

Still referring to FIGS. 10 and 11, the coupler component 62a also includes a receiver 118 that helps the sleeve 82 securely hold the spar 70, and thus the wing 44a, to the body 42 when the wing 44a is in the first position, the second position, and while the wing 44a moves from either of the positions to the other position. In this and other embodiments, the receiver 118 includes a first rail 120, a second rail 122, and a gap disposed between the rails 120 and 122. The rails 120 and 122 are oriented and mounted to the body 42 such that the gap between them is sized to snuggly receive a pin 124 that is mounted to the sleeve 82 and to allow the pin 124 to move between each of the rails as the sleeve 82 rotates about the pivot axis 84. In this manner, the first rail 120 restricts movement of the pin 124, and thus the sleeve 82, in the direction indicated by the arrow 126 (FIG. 10), and the second rail 122 restricts movement of the pin 124, and thus the sleeve 82, in the direction indicated by the arrow 128 (FIG. 10). By confining the pin 124, and thus the sleeve 82, the pin 101 that holds the sleeve 82 at the pivot axis 84 does not have to support the whole bending force from the wing 44a as the wing 44a moves from the first position to the second position, and vice versa.

Still referring to FIGS. 10 and 11, the pivot-track 96, the receiver's first rail 120 and second rail 122, the sleeve's first pin 101 and second pin, and other load bearing components of the coupler component 62a may include any desired material capable of withstanding the respective loads that each experiences while the vehicle is flown or driven. For example, in this and other embodiments each of the components includes an alloy of aluminum such as Al 2024, 7071-T6 or any suitable composite material, to provide a good strength to weight ratio. In other embodiments where the weight of the component is not as important, some or all of the components may include an alloy of iron, such as 4130 stainless steel.

Each of FIGS. 12 and 13 shows a perspective, partial view of the wing 44a in the second position and secured to the body 42 of the vehicle 40, according to an embodiment of the invention. To help secure the wing 44a in the second position, the coupler 68 (FIG. 3) also includes coupler components 126a and 126b (only 126a shown). Similar to each of the coupler components 68a and 68b that corresponds to a respective one of the wings 44a and 44b, each of the coupler components 126a and 126b also corresponds to a respective one of the wings 44a and 44b. And, similar to the discussion regarding the coupler component 68a applying to the coupler component 68b, the discussion of the coupler component 126a also applies to the coupler component 126b. FIG. 12 also shows a partial, perspective view of the flaperon's control mechanism 127.

The coupler component 126a may be configured as desired to help the wing's spar 70 and coupler component 68a securely hold the wing in the second position while the wing 44a and body 42 experience many different loads during take-off and flight. For example, in this and other embodiments the coupler component 126a includes a threaded bolt 128 that may be threadingly coupled with a nut 130 mounted to the body 42, and a bullet pin 132 that is mounted to the body 42 and received by the box 134 when the wing 44a reaches the second position. In the embodiment shown in FIGS. 12 and 13, the coupler component 126a includes two threaded bolts 128 and two nuts 130. Each bolt 128 has a motor 136 mounted to its head and coupled to a collar 138 which is moveable along a rail 140. The collar 138 and rail 140 anchor the motor 136 while the motor 136 rotates the bolt 128 relative to the nut 130, so that the bolt 128, not the motor 136, rotates relative to the nut 130. The rail 140 is mounted to the wing 44a, and as the bolt 128 moves into the nut 130, the collar 138 slides along the rail 140 toward the nut 130. When both of the bolts 128 are fully inserted in their respective one of the nuts 130 (FIG. 12), the bolts 128 coupling with the nuts 130 locks the wing 44a in the second position.

In this and other embodiments, the coupler component 126a also includes a sensor (not shown) disposed in the box 134, and a lock 142 mounted to the box 134. The sensor senses the location of the bullet pin 132 relative to the box 134 to allow one to determine whether or not the wing 44a has reached the second position, and thus finish rotating the wing 44a about the pivot axis 84 (FIG. 11) and begin locking the wing 44a in the position. The lock 142 inserts a pin (not shown) into a cavity in the bullet pin 132 to help the bolts 128 and sleeve 82 (FIG. 11) secure the wing 44a in the second position. The sensor may be any desired sensor capable of sensing the bullet pin's position relative to the wing 44a and conveying the sensed position to the pilot and/or other control system of the vehicle 40. For example, in this and other embodiments, the sensor generates and conveys an electric signal when the bullet pin 132 contacts the sensor, otherwise the sensor does not generate an electric signal. In this manner, in the absence of a signal from the sensor, the bullet pin 132 is considered not fully inserted into the box 134, and thus the wing 44a not in the second position. The lock 142 may be any desired lock that holds the bullet pin 132 to the box 134. For example, in this and other embodiments, the lock 142 includes a solenoid that when charged in response to a signal generated by the sensor, inserts a pin into the bullet pin 132.

To unlock the wing 44a from the second position, one simply withdraws the pin from the bullet pin 132, and rotates both bolts 128 to threadingly disengage each from their respective one of the nuts 130. Once unlocked, the wing 44a is ready to be moved into the first position for driving the vehicle 40 on a road.

Each of FIGS. 14 and 15 shows a perspective view of the control mechanism 127 that couples the wing's flaperon 65 (FIG. 1) to the control system in the cockpit 46 of the vehicle 40 shown in FIGS. 1 and 2, according to an embodiment of the invention.

In this and other embodiments, the control mechanism 127 includes a body-portion 145*a* and a wing-portion 145*b* that is coupled to the body-portion 145*a* when the wing 44*a* is in the second position, and is uncoupled and separated from the body-portion 145*a* when the wing 44*a* moves toward the first position. The body-portion 145*a* includes a plunger 146 mounted to the body 42 of the vehicle 40. And, the wing-portion 145*b* includes a flaperon torque-tube 144 that rotates about its longitudinal axis to pivot the flaperon 65 up or down relative to the wing's main body 78 (FIG. 3), and a receiver 148 disposed in the wing 44*a* that releasably couples the plunger 146 to the flaperon torque-tube 144. The body-portion 145*a* of the control mechanism 127 also includes a control rod 150 that transmits to the plunger 146 the pilot's and/or control system's instruction to move the flaperon 65. To move the flaperon 65 up relative to the wing's main body 78 to roll the vehicle 40, the control rod 150 moves in the direction indicated by the arrow 152. This causes the plunger 146 to rotate in the direction shown by the arrow 154, which in turn causes the receiver and the flaperon torque-tube 144 (via the universal joint 158), to rotate in the same direction. To move the flaperon 65 down relative to the wing's main body 78 to roll the vehicle 40, the control rod 150 moves in the direction indicated by the arrow 160, which causes the plunger 146 and flaperon torque-tube 144 to rotate in the direction indicated by the arrow 162.

The wing-portion 145*b* of the control mechanism 127 may be releasably coupled to the body-portion 145*a* in any desired manner. For example, in this and other embodiments the receiver 148 of the wing-portion 145*b* includes four keyways 164 (only two shown for clarity), each located about 90 degrees away from its adjacent keyways 164. Each of the four keyways 164 receives a respective one of four keys 166 (only two shown for clarity) of the plunger 146 when the wing 44*a* is in the second position. To facilitate the insertion of the keys 166 into their respective keyways 164, each of the keyways 164 has an entry whose width is much greater than the width of their respective one of the four keys 166. This allows the receiver 148 to still receive the plunger 146 when the keys and keyways are not exactly aligned or clocked relative to each other. As each of the keyways 164 extends toward the universal joint 158, each keyway's width reduces to a dimension that is slightly larger than the width of their respective one of the four keys 166. When the plunger 146 is fully inserted into the receiver 148, each of the keys 166 is held by the narrower portion of the respective one of the four keyways 164. In this manner, play between the rotation of the plunger 146 and the receiver 148 as one moves the control rod 150 may be minimized. In other embodiments, the plunger 146 may have wheels on each key, similar to the way a typical cv joint engages with a typical tripod-configuration shaft, to improve how easy the plunger 146 inserts into the receiver 148.

To facilitate the insertion and removal of the plunger's keys 166 from their respective one of the keyways 164, the plunger 146 may move relative to the control rod 150 in the directions indicated by the arrows 168 and 170. For example, in this and other embodiments the plunger 146 is held by a control horn 172 that transmits the movement of the control rod 150 to the plunger 146. The control horn 172 is mounted to the body 42 in such a way that the horn 172 may rotate in either of the directions indicated by the arrows 154 and 162 (FIG. 14) but cannot move toward or away from the receiver 148. And the plunger 146 is coupled to the control horn 172 in such a way that the plunger 146 rotates with the horn 172 in the directions indicated by the arrows 154 and 162, and may move relative to the horn 172 in the directions indicated by the arrows 168 and 170. The body-portion 145*a* of the control mechanism 127 also includes a spring 174 (two here but only one shown for clarity) that urges the plunger 146 in the direction indicated by the arrow 168, and thus the keys 166 toward their respective keyways 164. To move the plunger 146 away from the receiver 148, and thus withdraw the keys 166 from their respective keyways 164 one may pull the cables 176. The spring 178 also urges the plunger 146 in the direction indicated by the arrow 168 and provides a redundant means for urging the plunger 146 toward the receiver 148 should the spring 174 fail.

FIG. 16 shows a view of a weight system 180 included in the wing 44*a* of the vehicle shown in FIGS. 1 and 2, according to an embodiment of the invention. FIG. 17 shows a perspective view of a portion of the weight system 180 shown in FIG. 16, according to an embodiment of the invention. The weight system 180 includes a weight 182 that is moveable relative to the spar 70 of the wing 44*a* to move the location of the wing's center of mass. By moving this location, one may adjust the location of the vehicle's center of gravity while one drives the vehicle on the ground, and one may adjust the vehicle's moment of inertia, or rotational inertia, about the vehicle's roll axis while one flies the vehicle 40 through the air. By adjusting the vehicle's center of gravity, one can improve the vehicle's handling characteristics while driving the vehicle 40 on the ground. For example, with the wing 44*a* in the first position (ground mode) one can move the weight 180 toward the wing tip 76 to locate the vehicle's center of gravity farther from the vehicle's rear wheels and closer to the vehicle's front wheel. And, by adjusting the vehicle's moment of inertia about the vehicle's roll axis, one can improve the vehicle's handling characteristics while one flies the vehicle 40 through the air. For example, when the wing 44*a* is in the second position, one can move the weight 180 toward or away from the wing tip 76 to increase or decrease, respectively, the vehicle's moment of inertia, and/or to adjust the elastic response of the wing 44*a* to minimize flutter or unwanted vibrations while the vehicle travels in ground mode or flight mode.

The weight 182 may be moved relative to the spar 70 in any desired direction using any desired mechanism. For example, in this and other embodiments the weight 180 may be moved in the directions indicated by the arrows 186 and 188, which are essentially transverse to the vehicle's longitudinal axis 187 when the wing 44*a* is in the second position, and essentially parallel with the axis 187 when the wing 44*a* is in the first position. The weight system 180 includes a guide tube 184 that holds the weight 182 while allowing the weight 182 to move in the directions indicated by the arrows 186 and 188. To move the weight 182, the weight system 180 also includes a cable 190 having a first end 192 mounted to the weight 180 and a second end 194 also mounted to the weight 180. The system 180 also includes a motor 196 (FIG. 16) coupled to the cable 190. To move the weight 182 in the direction indicated by the arrow 188, the motor pulls the cable 190 to generate tension in the first end 192; and to move the weight 182 in the direction of the arrow 186, the motor 196 pulls the cable 190 in the opposite direction to generate tension in the second end 194.

Other embodiments are possible. For example, the movement of the weight 180 may include rotating about the guide tube 184 to provide a gyroscopic effect, which may be used to modify the vehicle's moment of inertia. The movement of the weight 180 may also include moving in directions other than, or in addition to, the directions indicated by the arrows 186 and 188. In addition, the weight 180 may be any desired weight, and may be removable from the guide tube 184, to allow one to increase or decrease the mass of the weight in response to anticipated flying and/or driving conditions. And, the weight 180 may include a coupler that allows one to add another weight that may include more, less or an equivalent mass, and connect the two or more weight together so that they can move as one. Also, the wing 44a may include one or more additional weight systems 180 to allow one more detailed control of the wing's center of mass.

Figure 18:
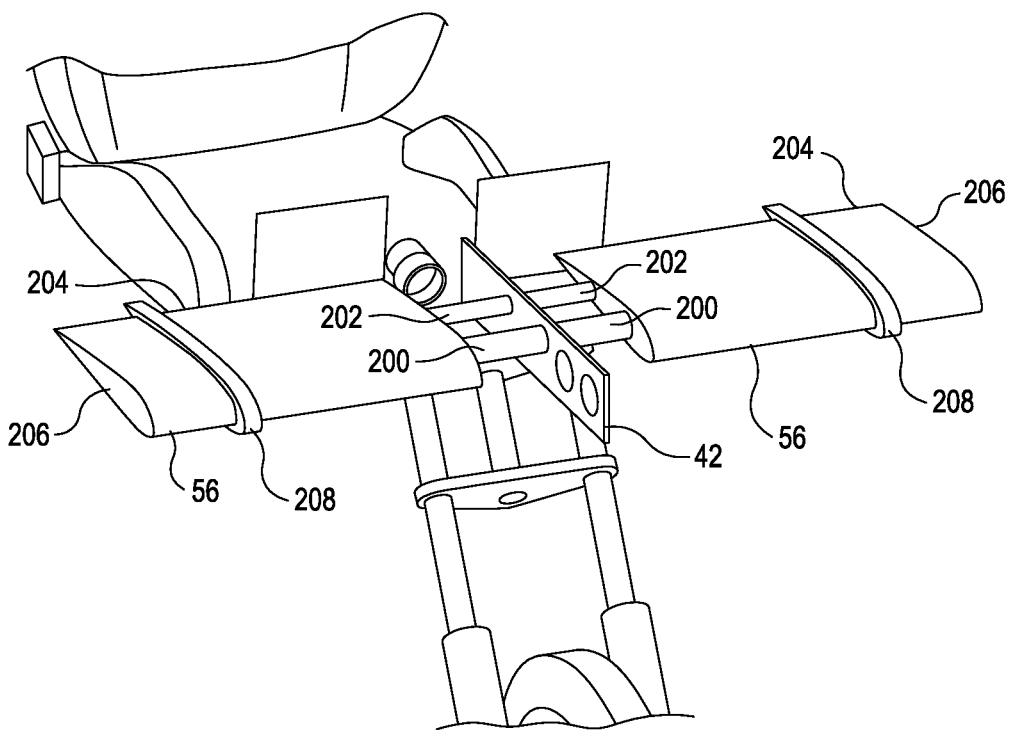
Figure 19:
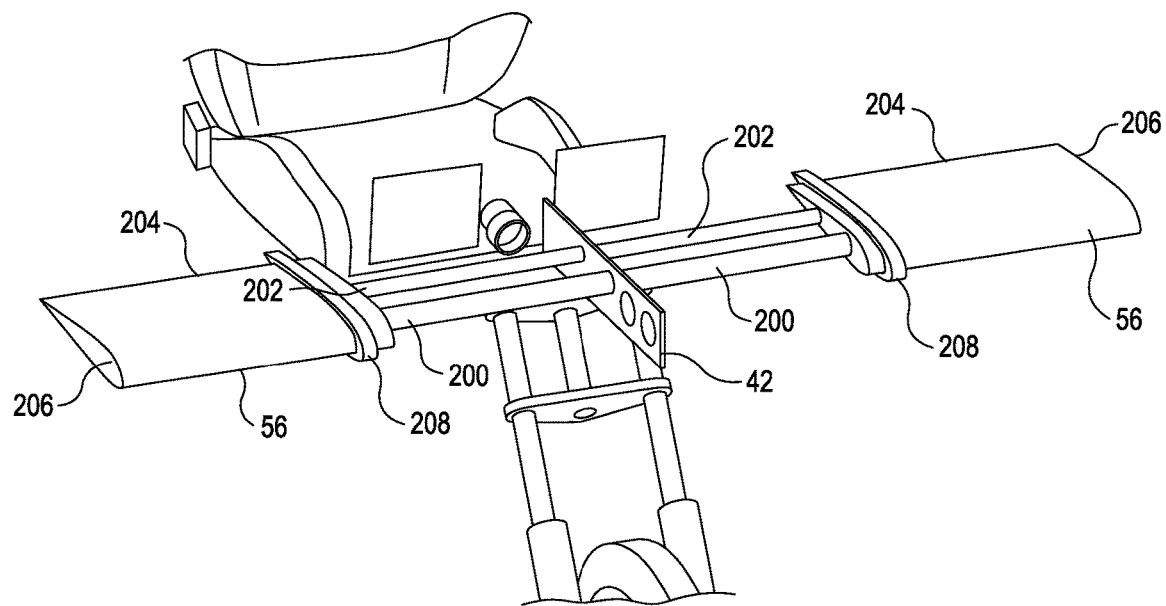
Figure 20:
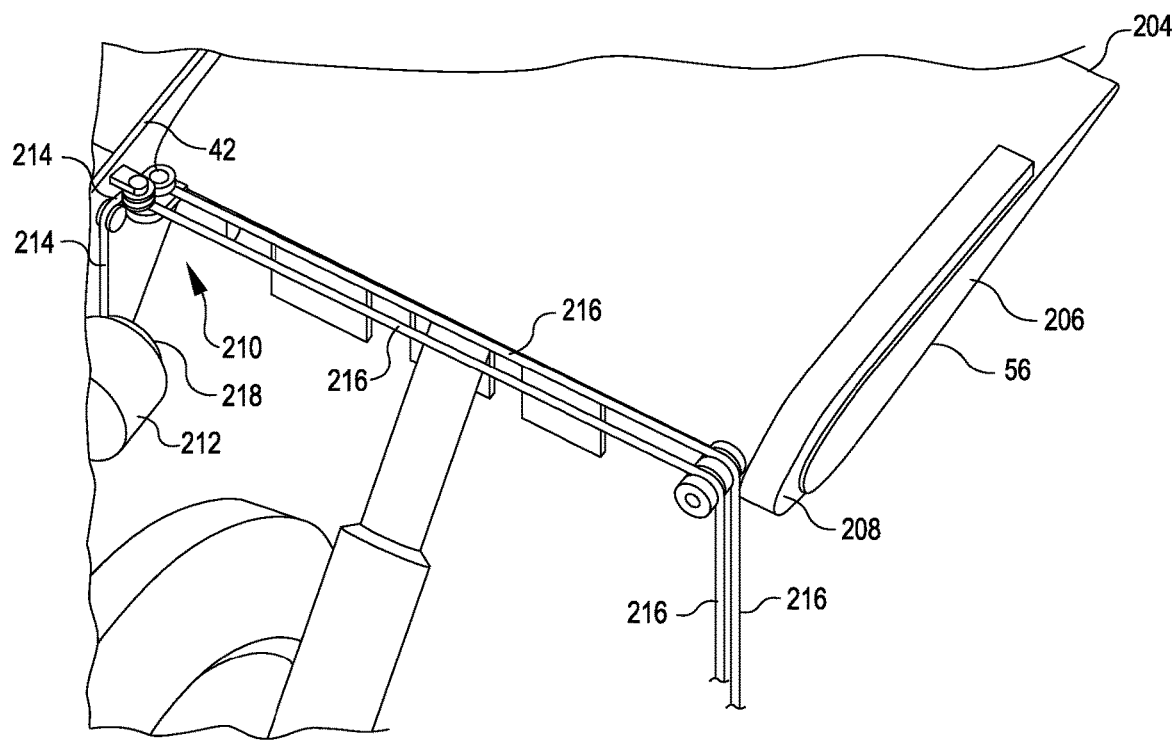
Figure 21:
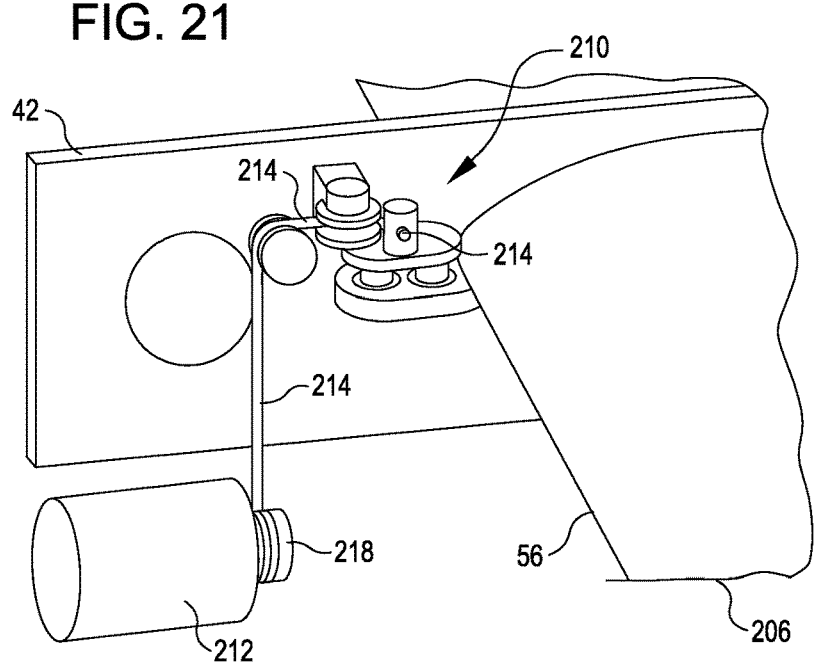

Each of FIGS. 18-21 shows a perspective view of the canards 56 of the vehicle 40 shown in FIG. 2, each according to an embodiment of the invention. FIG. 18 shows each of the canards 56 retracted to a first position in which each canard 56 is disposed within the body 42. While the vehicle 40 is driven on a road, one typically retracts each of the canards to the first position to protect them against damage from debris encountered during travel. FIG. 19 shows each of the canards 56 extended to a second position in which each canard extends away from the body 42. While the vehicle 40 is flown, one typically extends each of the canards 56 to generate lift and to help control the pitch of the vehicle 40. Each of the FIGS. 20 and 21 shows the mechanism 198 for extending and retracting each of the canards 56. Although FIGS. 20 and 21 shows the mechanism 198 that extends and retracts one of the canards 56, the other canard 56 is extended and retracted with a similar mechanism, and thus the discussion of the mechanism 198 also applies to the mechanism that extends and retracts the other canard 56.

Referring to FIGS. 18 and 19, each of the canards 56 may be configured as desired and may be mounted to the body 42 as desired, to allow each of the canards 56 to move from the first position to the second position and vice-versa, and to withstand the loads each experiences during flight. For example, in this and other embodiments each canard 56 includes a forward spar 200 and a rear spar 202, each mounted to the body 42. Each of the spars 200 and 202 is configured to telescope as their respective canard 56 moves from the first position toward the second position and vice-versa. Each of the canards 56 also includes a trim tab 204 powered by a motor (not shown) disposed in the canard 56 that pivots the trim tab 204 relative to the body 206 of each of the canards 56. During flight, when the motor pivots the trim tab 204 up, the vehicle 40 pitches downward, and when the motor pivots the trim tab 204 down, the vehicle 40 pitches upward. The body 42 includes a collar 208 (here two) that is mounted to the body and that helps the spars 200 and 202 hold each of the canards 56 in their first and seconded positions. The collar 208 includes a material that has a low static and dynamic coefficient of friction to allow the body 206 of each of the canards 56 to easily slide to and from the first and second positions. In other embodiments, the collar 208 may include a bearing that rotates relative to the collar 208 and that rolls across the body 206, as the body 206 moves to and from the first and second positions.

Referring to FIGS. 20 and 21, the mechanism 198 may be configured as desired to extend and retract each of the canards 56, and to position each of the canards 56 in the second (extended) position in the event that the mechanism 198 does not operate correctly. For example, in this and other embodiments the mechanism 198 includes a mount 210 anchored to the canard 56, a motor 212 anchored to the body 42, a cable 214 that couples the motor 212 to the mount 210, and a bungee 216 that couples the mount 210 to the body 42. The bungee 216 is sized and configured to generate tension when stretched, and is coupled to the body 42 and mount 210 such that the bungee 216 is more stretched when the canard 56 is in the first (retracted) position than the second (extended) position. To help keep the canard 56 in the extended position the mechanism 198 may also include a lock (not shown) that may be manually or automatically operated to prevent the canard 56 from moving toward the first position. The motor 212 retracts the canard 56 toward the first position by winding the cable 214 around a spool 218. This generates tension in the cable 214 sufficient to overcome the tension in the bungee 216 urging the canard 56 toward the second position, and thus urges the mount 210, and thereby the canard 56, toward the body 42. The mechanism 198 also includes a ratchet and pawl (not shown) that prevents the spool 218 from rotating in the direction that releases the tension from the cable 214 to hold the canard 56 in the first (retracted) position without the motor 212 generating tension in the cable 214. To move the canard 56 toward the second (extended) position, one simply releases the pawl from the ratchet to allow the spool 218 to rotate.

FIG. 22 shows a perspective view of the vehicle's power component 220, according to an embodiment of the invention. The component 220 powers the vehicle 40 (FIGS. 1 and 2) while it travels on a road (ground mode), and while the vehicle 40 flies through the air (flight mode).

The power component 220 may be configured as desired to provide the power that the vehicle 40 needs to travel on a road and fly through the air. For example, in this and other embodiments, the vehicle 40 includes a first motor 222 for powering the vehicle 40 in ground mode, a second motor 224 for powering the vehicle in flight mode, and a differential 226 for distributing the power generated by either of the motors 222 and 224 to either the propeller 52, one or more of the rear wheels 54, or both the propeller 52 and one or more of the rear wheels 54. In this manner, each of the motors 222 and 224 can help the other motor 224 or 222 power the vehicle 40 in either the ground mode or the flight mode, and each of the motors 222 and 224 may be used as a backup power source should the other motor 224 or 222 fail. The first motor 222 may be a conventional 80 to 1500 horsepower engine that meets EPA emission standards for street-legal motorcycles, and the second motor 224 may be a conventional aviation engine of between 150 and 1350 horsepower. In other embodiments, an electric motor powered by a lightweight, high-energy-density battery pack may be used to power the rear wheels 54 while in ground mode and the propeller 52 while in flight mode. In still other embodiments, each of the first and second motors 222 and 224, respectively, may be a jet engine or any other desired engine capable of powering the vehicle 40 in one or both of the ground and flight modes.

In this and other embodiments, the power component 220 also includes two driveshafts 228, each coupling a respective one of the rear wheels 54 to the differential 226. Each of the driveshafts 228 includes a constant velocity joint (not shown) to allow the driveshaft 228 to transmit power at a constant velocity to a sprocket 232 that is oriented relative to the longitudinal axis (not shown) of the driveshaft 228, at an angle other than 90 or 180 degrees. The power received by the sprocket 232 is transmitted to a rear wheel 54 via a chain 234. In a similar manner, the power generated by the first motor 222 is transmitted to the differential 226 via a chain 236. The power component 220 also includes a drive belt 238 coupling the propeller 52 to the second motor 224. Although, only one drive belt 238 is shown, the power component 220 includes more than one drive belt that also couples the propeller 52 to the second motor 224 to provide redundancy during flight. If the drive belt 238 fails during flight, then the one or more other drive belts will keep the propeller 52 coupled to the second motor 224, and thus will keep the propeller 52 generating thrust to power the vehicle 40 through the air.

FIG. 23 shows a perspective view of the cockpit 46 of the vehicle 40 shown in FIGS. 1 and 2, according to an embodiment of the invention. FIG. 24 shows another perspective view of the cockpit 46 shown in FIG. 23, according to an embodiment of the invention.

In this and other embodiments, the cockpit 46 includes two seats 48 one located aft of the other, a removable steering wheel 240 to allow a person sitting in the front seat to steer the vehicle 40 in ground mode, and two center sticks 242, each configured to allow a person sitting in a corresponding seat 48 to exert some control over the vehicle 40 in flight mode. The steering wheel 240 is removable from the body 42 where the steering wheel 240 extends into the cockpit 46 so that one can relocate the wheel 240 out of one's way while one uses the center stick 242 to control the vehicle 40 during flight, although the geometry is such that the stick used during flight mode is free and clear of the wheel through full range of motion even when the wheel for ground mode is installed. Each of the center sticks 242 may be used to control the pitch and the roll of the vehicle 40 during flight, much like a conventional airplane's center stick. In addition, the aft center stick 242 allows the person sitting in the aft seat 48 to exert some control over the vehicle 40 should the person in the front seat become incapacitated or distracted. Both center sticks 242 may be removed and reinstalled at will to improve occupants comfort while in ground mode. Optional rudder pedals may be installed for a person sitting in the aft seat, or middle of an aft bench seat, to control yaw on the ground and in the air while in flight mode.

Referring to FIG. 24, the cockpit 46 also includes rudder pedals 244 for controlling the vehicle's yaw during flight, ground-mode pedals 246 for controlling the vehicle's speed and power during travel in ground mode, and a box 248 to isolate the rudder pedals 244 from the ground-mode pedals 246. By isolating the rudder pedals 244 from the ground-mode pedals 246, a person flying the vehicle 40 is less likely to inadvertently use the ground-mode pedals 246, and a person driving the vehicle 40 is less likely to inadvertently use the rudder pedals 244, both of which could cause the person to lose control of the vehicle 40 and experience an accident.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A vehicle for providing one or more people air and ground transportation, the vehicle comprising:

a body configured to carry one or more persons while the vehicle flies through air or travels on the ground;

a wing coupled to the body and moveable from a first position in which the wing does not generate lift as the body moves through air, to a second position in which the wing generates lift as the body moves through air, wherein the wing includes a spar having an end; and a coupler that is configured to attach the wing to the body and to hold the wing in the first position and in the second position, and operable to hold the wing as the wing moves from the first position to the second position, wherein as the wing moves from the first position toward the second position the wing rotates about a longitudinal axis, and that includes a sleeve:

configured to surround and hold the spar's end when the wing is in the first position, the second position, and as the wing moves from the first position toward the second position, and mounted to the body such that the sleeve is pivotable, relative to the body, about a pivot axis passing through the sleeve.

2. The vehicle of claim 1 wherein the body is configured to carry two persons, one located aft of the other.

3. The vehicle of claim 1 wherein the body is configured with a bench seat aft of a front seat, wherein the bench seat can carry two or three people.

4. The vehicle of claim 1 wherein the body is configured with two or three seats aft of a front seat, and wherein the seats can carry one, two or three people.

5. The vehicle of claim 1 wherein the body is configured with a middle row seat or seats for one, two, or three people and a third row seat or seats for one, two, or three people.

6. The vehicle of claim 1 wherein the body is configured with an area for a medivac litter on one or the other side of the vehicle with the front occupant seat and any rear seats offset to one side or the other of the vehicle to make room for the litter.

7. The vehicle of claim 1 wherein the wing is also moveable from the second position to the first position.

8. The vehicle of claim 1 wherein the coupler includes:
a pivot-track mounted to the body,
a pivot-follower mounted to the end of the spar, and
wherein, as the wing moves from the first position toward the second position, the pivot-track directs the pivot-follower in a direction that causes the spar to rotate about the longitudinal axis.

9. The vehicle of claim 1 further comprising:
a propeller operable to move the vehicle, and
a motor operable to rotate the propeller.

10. The vehicle of claim 1 further comprising:
a wheel operable to move the vehicle to provide ground transportation, and
a motor operable to rotate the wheel.

11. The vehicle of claim 1 further comprising:
a propeller operable to move the vehicle,
a wheel operable to move the vehicle to provide ground transportation,
a first motor operable to rotate the propeller, and
a second motor operable to rotate the wheel.

12. A method for moving a wing of a vehicle, which provides one or more people air and ground transportation, from a first position toward a second position, the method comprising:

rotating from a first position toward a second position, a wing of the vehicle about a pivot axis that extends through a sleeve that surrounds an end of the wing's spar, wherein when the wing is in the first position the wing does not generate lift as the body moves through air, and when the wing is in the second position the wing generates lift as the body moves through air; and rotating the wing about a longitudinal axis before the wing reaches the second position.

13. The method of claim 12 wherein rotating the wing about the pivot axis includes rotating the wing about 90 degrees.

14. The method of claim 12 wherein rotating the wing about the pivot axis includes rotating the wing in an aft direction relative to the body as the body moves through air.

15. The method of claim 12 wherein rotating the wing about the longitudinal axis includes rotating the wing about the longitudinal axis while rotating the wing about the pivot axis.

16. The method of claim 12 wherein rotating the wing about the longitudinal axis includes rotating the wing about the longitudinal axis after the wing leaves the first position and before the wing reaches the second position.

17. The method of claim 12 wherein rotating the wing about the longitudinal axis includes rotating the wing about 90 degrees.

18. The method of claim 12 wherein rotating the wing about the longitudinal axis includes rotating the spar's end relative to the sleeve.

19. The method of claim 18 wherein rotating the wing about the longitudinal axis includes a pivot-track, which is mounted to the body, directing a pivot-follower, which is mounted to the end of the spar, in a direction that causes the spar to rotate about the longitudinal axis.

* * * * *